US012540721B2

(12) United States Patent
Wise

(10) Patent No.: US 12,540,721 B2
(45) Date of Patent: Feb. 3, 2026

(54) MODULAR, UNIVERSAL, AND STANDALONE EYEWEAR CIRCUMAMBIENT ILLUMINATION KITS AND SYSTEMS

(71) Applicant: CIE TECHNOLOGIES LLC, Pasadena, CA (US)

(72) Inventor: Matthew A Wise, Pasadena, CA (US)

(73) Assignee: Luminyx LLC, Nashville, TN (US)

( * ) Notice: Subject to any disclaimer, the term of this patent is extended or adjusted under 35 U.S.C. 154(b) by 0 days.

(21) Appl. No.: 19/092,511

(22) Filed: Mar. 27, 2025

(65) Prior Publication Data

US 2025/0341301 A1 Nov. 6, 2025

Related U.S. Application Data

(63) Continuation-in-part of application No. 18/652,632, filed on May 1, 2024, now Pat. No. 12,443,056.

(51) Int. Cl.
| | |
|---|---|
| *F21V 21/084* | (2006.01) |
| *F21V 23/04* | (2006.01) |
| *F21Y 115/10* | (2016.01) |
| *G02C 11/00* | (2006.01) |
| *G02C 11/04* | (2006.01) |
| *H05B 45/10* | (2020.01) |
| *H05B 45/325* | (2020.01) |

(52) U.S. Cl.
CPC ........ *F21V 21/084* (2013.01); *F21V 23/0414* (2013.01); *G02C 11/04* (2013.01); *G02C 11/10* (2013.01); *H05B 45/10* (2020.01); *H05B 45/325* (2020.01); *F21Y 2115/10* (2016.08)

(58) Field of Classification Search
CPC ............................. F21V 21/084; G01C 11/04
See application file for complete search history.

(56) References Cited

U.S. PATENT DOCUMENTS

| 3,634,676 A | 1/1972 | Castellano |
| 4,254,451 A | 3/1981 | Cochran, Jr. |
| 5,722,762 A * | 3/1998 | Soll ........................ G02C 11/04 |
| | | 362/187 |

(Continued)

FOREIGN PATENT DOCUMENTS

| CN | 104678580 A | 6/2015 |
| GB | 2070221 A | 9/1981 |
| TW | M634971 U | 12/2022 |

OTHER PUBLICATIONS

International Search Report and Written Opinion dated Jun. 3, 2025 in PCT/US2025/025449 (13 pages).

(Continued)

*Primary Examiner* — Keith G. Delahoussaye
(74) *Attorney, Agent, or Firm* — YOUNG LAW FIRM, P.C.

(57) ABSTRACT

A circumambient illumination device attachable to eyewear of a user may include a light-emitting element support configured to fit over a user's eyewear, a plurality of light-emitting elements integrated with the light-emitting element support and positioned to emit light above, below and around the user's eyes, and a fastening mechanism configured to attach the light-emitting element support to the user's eyewear. In use, the circumambient illumination device is configured to provide shadow-free illumination of the workspace facing the user's eyes.

21 Claims, 22 Drawing Sheets

(56) References Cited

U.S. PATENT DOCUMENTS

| | | | |
|---|---|---|---|
| 5,946,071 A | 8/1999 | Feldman | |
| 6,824,265 B1 * | 11/2004 | Harper | G02C 11/04 351/158 |
| 6,857,739 B1 | 2/2005 | Watson | |
| 7,377,664 B2 | 5/2008 | Waters | |
| 7,431,453 B2 * | 10/2008 | Hogan | G02C 7/088 351/158 |
| 7,566,139 B1 * | 7/2009 | Dority | F21V 21/084 362/253 |
| 8,899,744 B2 | 12/2014 | Waters | |
| 9,322,535 B1 | 4/2016 | Al Rasheed et al. | |
| 10,139,652 B2 | 11/2018 | Waters | |
| 10,391,310 B2 | 8/2019 | Windham | |
| 10,391,312 B2 | 8/2019 | Mowery | |
| 11,287,675 B1 | 3/2022 | Liu et al. | |
| 11,746,999 B1 * | 9/2023 | Ernst | F21V 23/0421 362/105 |
| 2007/0200998 A1 | 8/2007 | Schrimmer et al. | |
| 2008/0316734 A1 * | 12/2008 | Spartano | F21V 29/89 362/373 |
| 2009/0213324 A1 | 8/2009 | Cairson | |
| 2011/0037606 A1 | 2/2011 | Boise | |
| 2018/0246348 A1 | 8/2018 | Jordan | |
| 2019/0277481 A1 | 9/2019 | Shiratori | |
| 2020/0124877 A1 | 4/2020 | Hsu | |
| 2021/0311322 A1 | 10/2021 | Belanger et al. | |
| 2022/0244575 A1 | 8/2022 | Castaneda | |
| 2024/0069363 A1 | 2/2024 | Caspari | |

OTHER PUBLICATIONS

Written Opinion of the International Searching Authority in dated Apr. 18, 2024 in PCT/US2023/083375 (4 pages).

* cited by examiner

MODULAR, UNIVERSAL, AND STANDALONE EYEWEAR CIRCUMAMBIENT ILLUMINATION KITS AND SYSTEMS

CROSS-REFERENCE TO RELATED APPLICATIONS

This application is a continuation-in-part of application Ser. No. 18/652,632 filed May 1, 2024, which is incorporated herein by reference in its entirety and for all purposes.

BACKGROUND

Field of the Invention

The embodiments disclosed herein relate generally to kits and systems for providing circumambient and shadow-free or shadow-minimizing illumination around the user's eyes.

DETAILED DESCRIPTION

Figure 1:
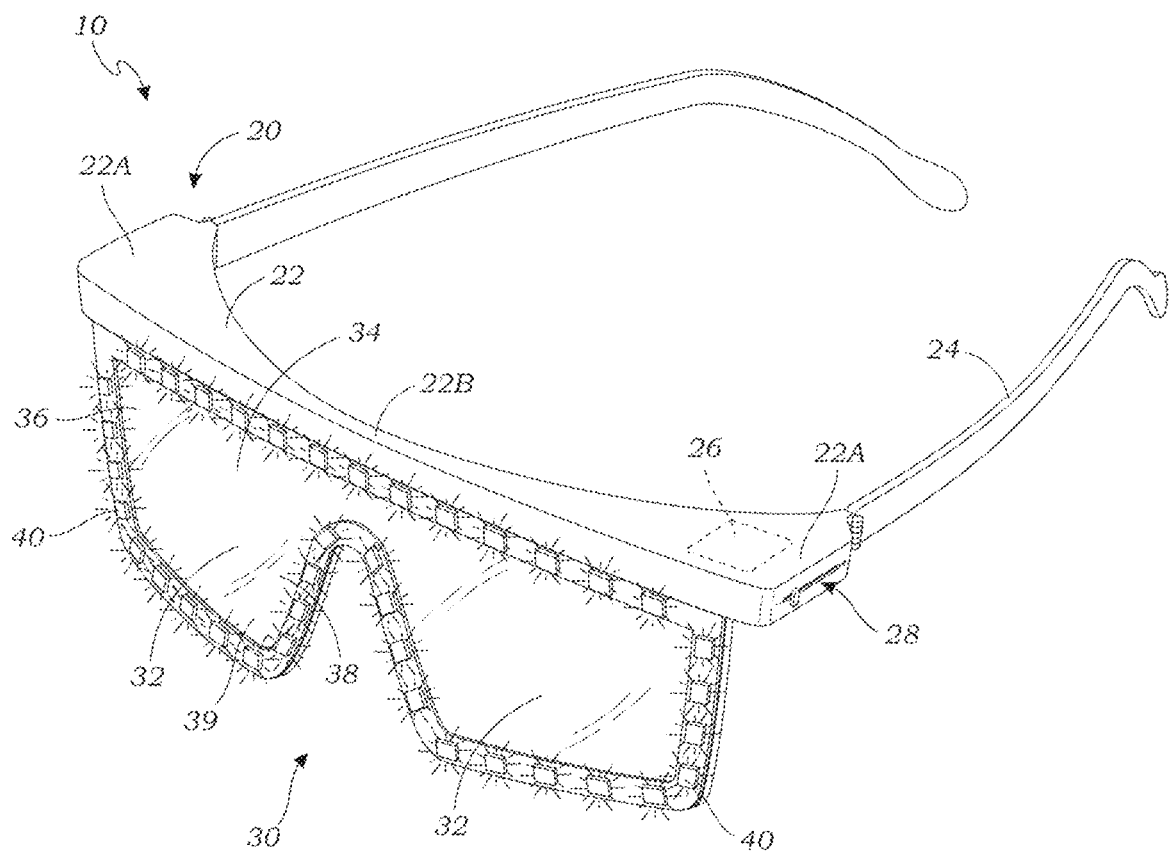
FIG. 1 is a perspective view of a circumambient illumination eyewear according to one embodiment.

Conventional illuminated eyewear (e.g., lighted glasses, goggles, and the like) do not provide illumination that adequately illuminates the wearer's workspace. Indeed, such conventional eyewear not only weakly illuminates the eyewear user's workspace (his or hers near field of view) but does so while creating shadows in the illuminated a. These shadows obscure portions of the work field as the feeble light emitted from the eyewear can often be considered to be a point source of light which, depending upon the angle of incidence on objects within the workspace, illuminates some features while failing to illuminate other features. Moreover, the feeble light intensity emitted by such eyewear is often weaker than the existing ambient light in the room where they used, thereby failing to shine light in the shadows created by the existing light fixtures. Some conventional illuminated eyewear is purely for decorative or for entertainment purposes and fails to provide circumambient, shadow-free illumination of a workspace.

What needed, therefore, eyewear devices (e.g., glasses, facemasks, goggles, eyewear frames (with or without lenses), loupes and magnifiers that provide bright, circumambient illumination to a user's workspace in such a manner as to provide shadow-free illumination of the user's workspace. In one embodiment, therefore, circumambient illumination eyewear provides illumination from light sources disposed mostly or completely surround each eye or both of the eyes of the user, for shadow-free illumination of the workspace. In one embodiment, the circumambient illumination eyewear provides illumination from light sources disposed around the lens or lenses of the eyewear. In yet another embodiment, the circumambient illumination eyewear provides illumination from light sources disposed around the periphery of the eyewear and that face away from the user's eyes. In another embodiment, circumambient illumination eyewear provides a luminous flux intensity of at least 50 lumens of illumination onto the workspace, for superior, shadow-free illumination in even the darkest of workspaces. Within the context of the present disclosure, the term "workspace" is intended to cover any that requires illumination. Therefore, workspaces can include a desk, workbench, a sterile field in an operating room, complex machinery, or wiring or any other a that would benefit from substantially shadow free lighting. Other potential workspaces include a person's close field of view while carrying out activities including, for example, camping, rock climbing, law enforcement, military, health care, and the like. Moreover, embodiments may find utility for emergency crews, EMTs/paramedics, firefighters, repair crews, Information Technology (IT) personnel, home repair/contractors, construction, mechanics, mining operations, dentists and dental hygienists, doctors, surgeons, nurses, those participating in outdoor activities, sports, and the like.

Other features and significant aspects of the disclosed embodiments will become apparent from the following more detailed description, taken in conjunction with the accompanying drawings.

Figure 2:
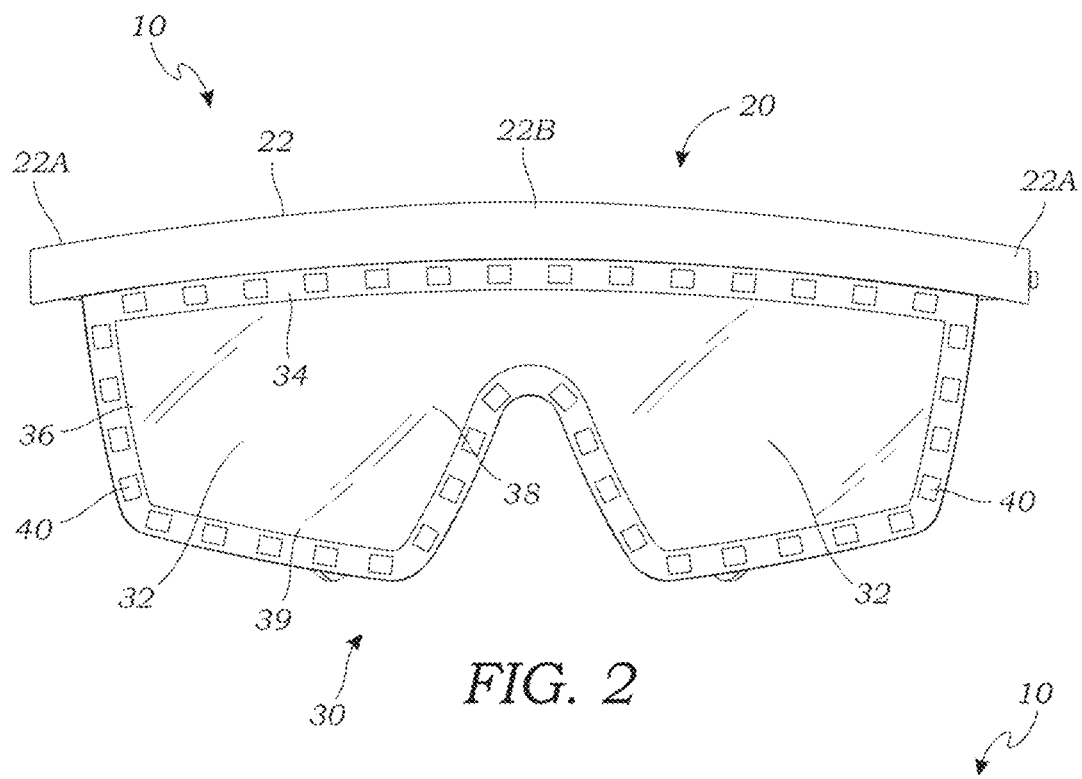
FIG. 2 is a front plan view of the eyewear of FIG. 1.
Figure 3:
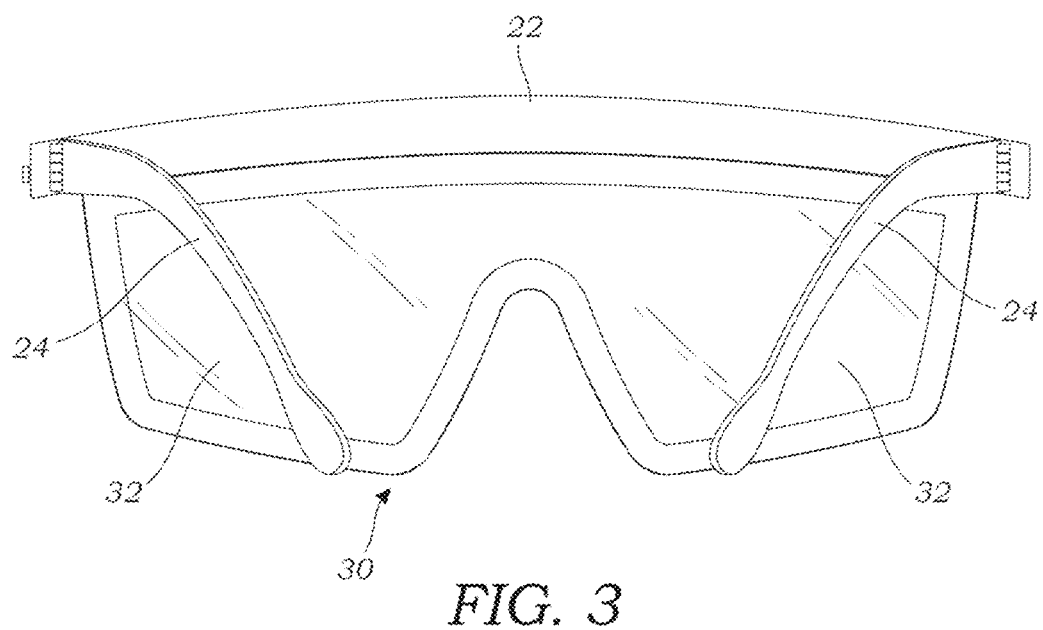
FIG. 3 is a rear plan view of the eyewear of FIG. 1.
Figure 4:
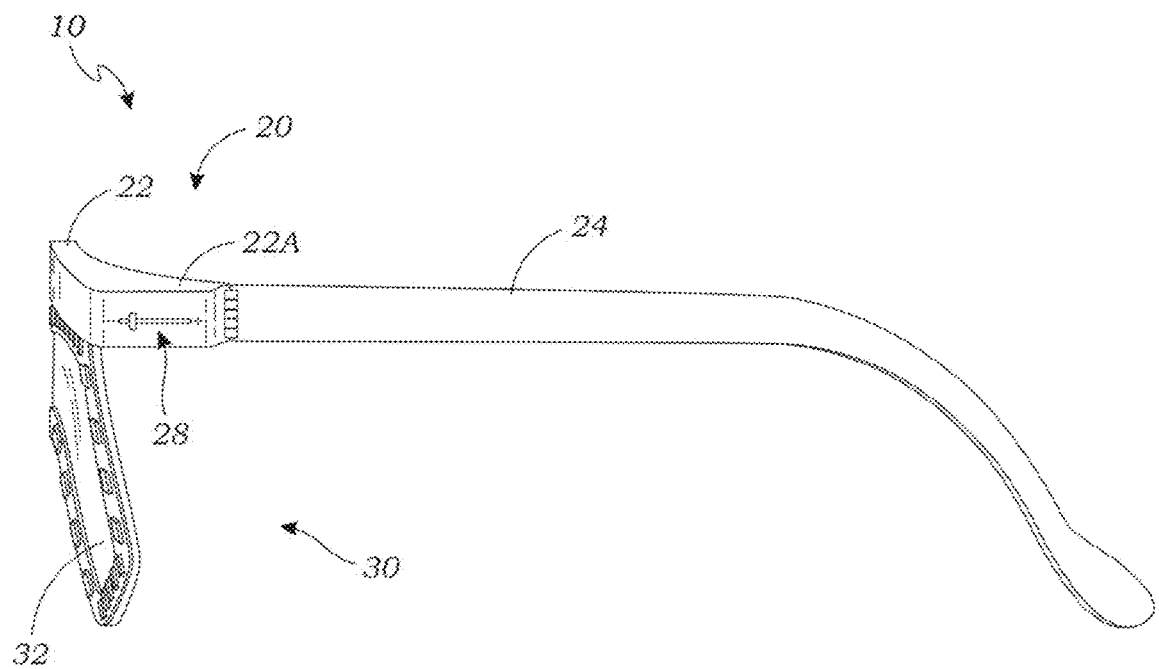
FIG. 4 is a side elevation view of the eyewear of FIG. 1.

FIG. 1 is a perspective view of a circumambient illumination eyewear 10 according to one embodiment. FIG. 2 is a front plan view thereof; FIG. 3 is a rear plan view thereof; and FIG. 4 is a side elevation view thereof. Considering now FIGS. 1-4 collectively, the circumambient illumination eyewear 10 includes a frame 20 sized and shaped to be mounted over the eyes of the user and configured to be removably fitted to the user's head, in the same manner as a pair of glasses or goggles. The frame 20 may include a bridge portion 22 that extends between temple ends 22A, and across a midsection 22B that is positioned, in use, above the user's nose.

The frame 20 further includes mounting structures that enable the eyewear 10 to be mounted over the user's face. In this embodiment, such mounting structures may include a pair of stems 24 that may be pivotally or somewhat elastically or flexibly mounted on, coupled to or integral with the temple ends 22A of the frame 20. However, in alternative embodiments, these mounting structures may be or include a flexible strap 25 (shown in FIG. 6) that wraps around the user's head, or any other structure that enables the eyewear 10 to fit onto the user's face. Structures other than stems or straps may be implemented to advantageous effect.

An eye covering portion 30 of the eyewear 10 may be mounted to the frame 20. In the embodiment of FIG. 1, the frame includes the bridge 22. However, in other embodiments, the frame 20 may not include a bridge portion 22 and the eye covering portion 30 may be mounted directly to the mounting structures (such as the stems 24). The eye covering portion 30 may include a single lens 32 or a pair of lenses 32 mounted onto the frame 20. Herein, the term "lens" is expressly intended to cover embodiments in which the lens is configured to correct vision by refracting incident light or embodiments in which the eye covering portion is but a clear eye shield (e.g., glass, plastic or polycarbonate) that does not provide appreciable eyesight correction, much in the same manner as the lens of safety glasses or goggles. Also, the term "pair of lenses", as used herein, is defined to broadly include any construction that has a region thereof that cover each of the user's eyes, whether formed of a single piece (as illustrated in FIGS. 1-4 and 6-9, 11-12), or of two or more physically separated pieces (as illustrated in FIG. 10). Also, the terms "lens or lenses" include any form of transparent or partially-opaque non-permeable material having two opposed surfaces that covers the user's eyes, whether or not any of these opposed surfaces curved or not. It is not required that these elements be curved in a manner that directs light rays in any manner. The pair of lenses may have curvatures for directing light, they may be tinted or otherwise coated, and/or have any other treatments-such as to reduce glare, as is known in the eyewear arts.

As shown in FIG. 1, the lens or lenses 32 may comprise an upper edge 34 that may be mounted to the bridge 22 of the frame 20, an outer side edge 36 that extends downwardly from the temple end 22A, an inner side edge 38 that extends downwardly from the midsection 22B, the outer side edges 36 and the inner side edges 38 being connected by a bottom edge 39. Alternatively, the lens or lenses 32 may define an outer edge that at least partially surrounds each or both of the user's eyes, however that outer edge may be shaped.

As shown in FIGS. 1-2, at least one illumination strip 40 may be disposed around the lens or lenses 32 in such a manner that the illumination strip(s) 40 emits light from at least the upper edge 34 and the bottom edge 39 of the frame 20. In other embodiments, anywhere where a single illumination strip is shown in the drawings, there may be two or more rows of illumination strips provided, following a roughly parallel path. In some embodiments, the illumination strip 40 may be in the form of a single elongate illumination element or series of elements disposed around each pair of lenses 32. In other embodiments, the illumination strip(s) 40 may be implemented as separate illumination elements or groups of illumination elements disposed on the upper edge 34 and bottom edge 39, and optionally adjacent the side edges of the lens or lenses.

In this embodiment, the illumination strip(s) extend entirely around the outer periphery of the lens 32 or pair of lenses, that is, along the upper edge 34, the outer side edge 36, the bottom edge 39, and the inner side edge 38, and emits light from each edge 34, 36, 39, and 38. The illumination strip(s) 40 may thus form an annular structure that uniformly surrounds the single lens 32 or the pair of lenses 32. In other embodiments, the constituent light elements of illumination strip or strips 40 may, as shown in FIGS. 1-2, be spaced apart from one another along at least a portion of the periphery of the lens 32 or the pair of lenses 32, so long as, in one embodiment, the majority (at least 50%) of each of the sides of the lens 32 or pair of lenses is covered by or includes light emitting elements. In some embodiments, uniform coverage may be provided along all sides as far as practicable, but it is expected that some variance may be required due to limitations in the structure of the eyewear, including weight considerations. Alternative examples of the illumination strips 32 shown in FIGS. 6-12 and discussed further below.

Figure 6:
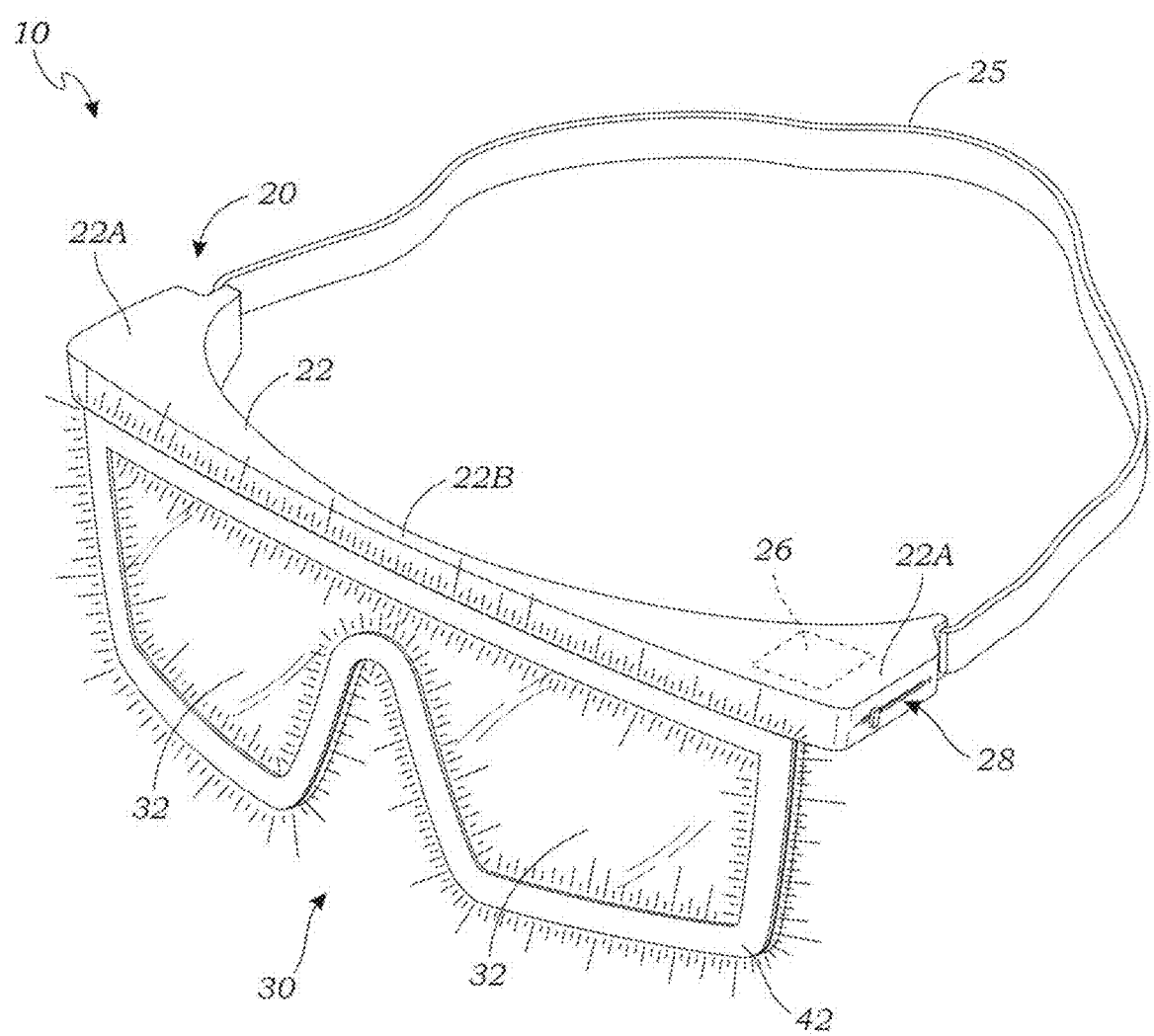
FIG. 6 is a perspective view of a second embodiment of the present circumambient illumination eyewear.

In the embodiment of FIGS. 1-2, the illumination strip(s) 40 may include one or more Light Emitting Diode (LED) strips; however, in other embodiments, such as shown in FIG. 6, other forms of illumination may be used, such as an illumination cord 42 (shown in FIG. 6), and/or any other form of illumination. For example, the illumination strip(s) 40 may rely on chemiluminescence or other forms of electroluminescence to generate light. In another embodiment, fiber optics may be used in which extruded (or similarly formed) fibers may be attached to the frame 20 in any desired layout, e.g., side-by-side, lining the entire frame 20, or on only select portions. Other non-LED light sources may be incandescent light sources such as tungsten filament, halogen, sodium vapor, neon, fluorescent, or any other light source known in the art, as deemed suitable for different lighting situations, safety considerations and desired workspace effects. Xenon-based illumination may be provided, which is particularly favored in the medical/surgical fields. Some embodiments may require an external power source electrically coupled to the circumambient illumination eyewear. In other embodiments, the illumination strip(s) 40 may include non-visible lighting such as ultraviolet (including UVA) or infrared. Moreover, the illumination strip or strips 40 may be configured to generate light in only a single frequency or light comprising only a limited number of frequencies (colors). In the case of multiple light sources on a single frame 20, each light source may include a different switch/dimmer to adjust the intensity of the emitted light as desired, or the illumination strips 40 may be connected to the same switch, or to different and independent switches and/or dimmers. The illumination strip or strips 40 may comprise more than one type of light emitting element, according to the envisaged application.

At least one illumination strip 40 may include high intensity lighting elements that emit, collectively, at least 50 lumens onto the workspace. In the present context, the term "workspace" refers to a physical space that the user is looking at through the present eyewear 10. An output of at least 50 lumens is significantly stronger than decorative lighting, which tends to be limited to 1-30 lumens. In one embodiment, the illumination strip(s) 40 may collectively generate an output of at least 100 lumen, and stronger systems, according to other embodiments, may have an output of about 500 lumen or more.

According to embodiments, the illumination strip(s) 40 may be covered by a protective clear covering that may be separate from or integrated into the frame 20, to protect the light emitting elements from debris and contaminants in the user's workspace, to provide a smooth tactile feel and to enhance the aesthetics of the eyewear. According to some embodiments, the illumination strip(s) 40 of the eyewear 10 may include a (e.g., reflective) backing, disposed between the forward facing illumination strip(s) and the user's face, which directs light in a forward direction, away from the user's eyes. Embodiments may also include a diffuser for properly diffusing the light, and/or a lens or lenses over at least some of the light emitting elements for directing the light emitted in a desired direction—e.g., away from the user's eyes and toward the intended workspace. Significantly, since the light emitted by the eyewear 20 is coming from every or at least several direction around the eyes of the user, no shadows of any significance can form in the workspace, which facilitates work being performed in the workspace, increases productivity and workplace safety.

Figure 5:
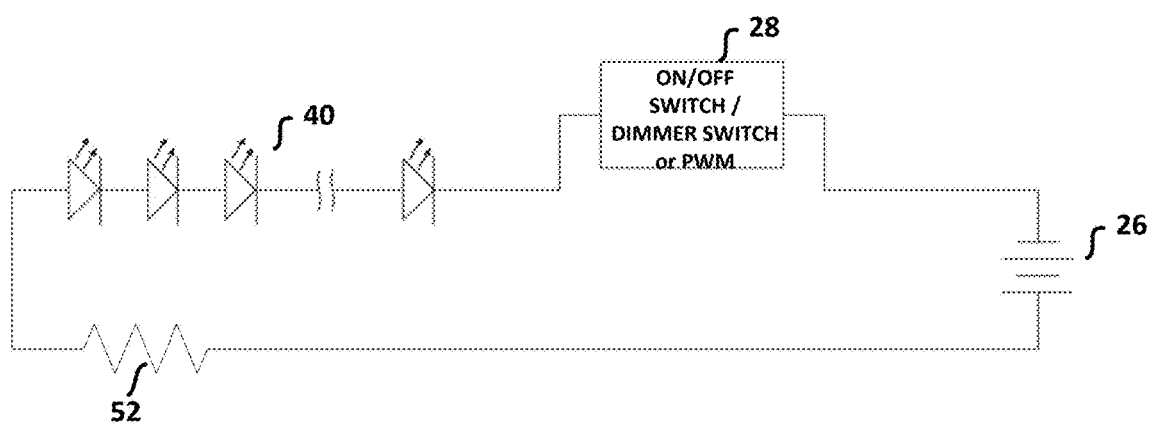
FIG. 5 is a simplified schematic of one possible implementation of the electrical supply and controls used in the circumambient illumination eyewear of FIG. 1.

FIG. 5 is a schematic of one embodiment of electronics used in the circumambient illumination eyewear of FIG. 1. FIG. 5 shows an embodiment in which the light emitting elements comprise a plurality of series-connected LEDs. Other forms of illumination will require other circuit topologies, components, and values. As shown in FIGS. 1 and 5, the illumination strip(s) 40 may be connected to a DC battery 26 through a switch 28. The switch 28 may be an ON/OFF switch and may include dimmer switch functionality. A switching potentiometer may be used for this purpose. In the case where a simple ON/OFF switch is used, (no dimming capability), a current limiting resistor 52 may be required in series with the light emitting elements. The circuit of FIG. 5 may also include several branches (each comprising a train of series-connected LEDs and a current limiting resistor) connected in parallel. Other sources of illumination will require other supply/control/biasing/ballast circuits according to requirements. In one embodiment, the battery 26 may be mounted in the frame 20 at one (or both) of the temple ends 22A, for example. However, other locations may also be used. For example, the battery 26 may be mounted on the stem 24 or stems 24, or it may be mounted on a structure that surrounds the user's head and electrically connected to the illumination strip(s) 40. Alternatively still, a small battery pack may be provided that is attachable to the user's waist and electrically connected via a cable to the present circumambient eyewear. The dimmer switch 28 may be provided, to enable the intensity of the illumination to be adjusted. An LED driver circuit may be provided that is configured to provide an adjustable regulated current source to the LEDs. The current regulation (and control of illumination intensity) may be effectuated through an on-chip potentiometer and/or a pulse width modulation (PWM) signal, to account for, for example, temperature fluctuations that can affect the current draw by the LEDs and detrimentally affect the state of charge of the battery or batteries.

Indeed, according to another embodiment, a PWM may be implemented to vary the intensity of the emitted light. Using a PWM module, the LEDs turned on and off at a sufficiently rapid rate that is imperceptible to the user. By adjusting the ratio of time on vs time off (duty cycle), the apparent brightness of the light emitted by the illumination strip(s) 40 may be adjusted without appreciable generation of heat in a dimmer switch. Advantageously, the lifetime of the battery 26 will be longer using a dimming solution based on PWM than it would otherwise be by converting current from the battery 26 into heat in a resistor-based dimmer switch. Other methods of varying the light intensity may also be implemented. The battery may be a disposable lead acid battery or may be a rechargeable battery incorporating, for example, lithium-ion chemistry. In case a rechargeable battery is used, a charging port may be provided or wireless charging functionality may be provided.

FIG. 6 is a perspective view of a second embodiment of the circumambient illumination eyewear 10. As noted above, FIG. 6 illustrates the illuminated cord 42 that surrounds each or both of the user's eyes, and the frame 20 in this implementation is held in place with a flexible strap 25 rather than rigid stems. As in other embodiments, the frame 20 may be configured as shown in FIG. 6 or may be significantly different therefrom, as long as the frame 20 functions to support the lens or lenses 32 on the user face and optionally supports or at least connects to the ON/OFF and dimmer functionalities discussed herein. In the drawings, a manual ON/OFF switch/dimmer switch is shown at reference numeral 28. In other embodiments, however, voice control of such functions may be preferable, to enable hands-free control of illumination. It is anticipated that Systems On Chip (SOC) incorporating such ON/OFF and voice recognition functionalities may be sufficiently reliable and inexpensive so as to make their integration in the present eyewear 10 both useful and economically viable at scale. For example, using such a system, a surgeon may be able to simply say increase illumination by 20%, all the while keeping her hands on the patient and task at hand.

Figure 7:
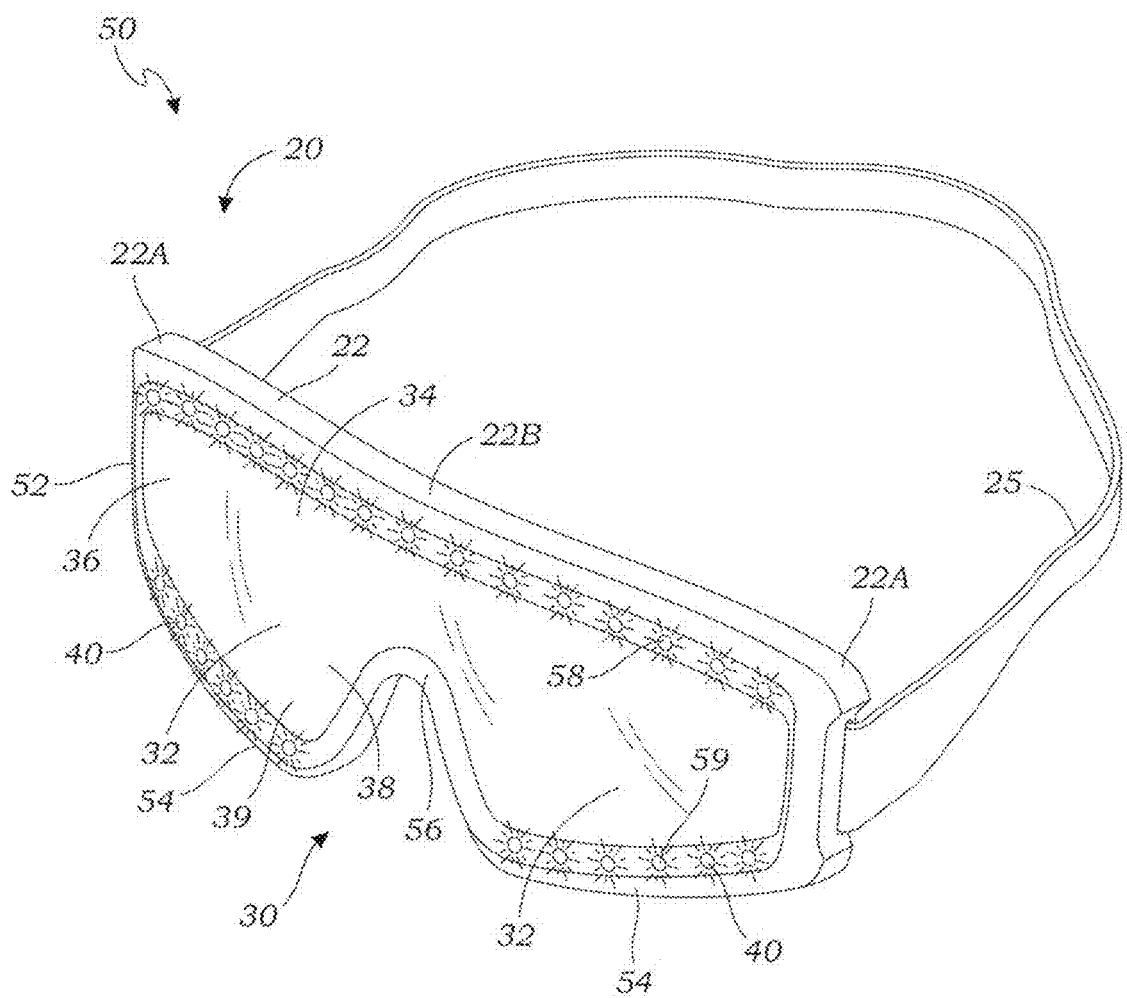
FIG. 7 is a perspective view of a third embodiment of the present circumambient illumination eyewear.

FIG. 7 is a perspective view of a third embodiment of the circumambient illumination eyewear 50. As shown in FIG. 7, the frame 20 may include a side frame portion 52 adjacent to the side edge 36 of the lens 32, and bottom frame portions 54 that are generally disposed underneath each of the eyes of the user while the eyewear 50 is being worn. The bottom frame portions 54, as shown, may be connected by a nose receiving notch 56 that is shaped to rest upon the user's nose. In this embodiment, the lighting strip or strips 40 may include a top line of discrete light sources 58 (as shown) or a continuous light source along most of or substantially all of the bridge 22, and further includes a bottom line of discrete light sources 59 or a continuous light source along most of or substantially all of each of the bottom frames 54. In this embodiment, the nose receiving notch 56 may not include any illumination source or sources, but in other embodiments illumination may be included there as well.

In one embodiment, the illumination strip, or strips 40 may be configured to emit light having a frequency that is outside of the visible spectrum (e.g., infrared, just below the visible frequency end of the spectrum, or indigo or ultraviolet just above the higher end of the visible spectrum). However, in other embodiments, such non-visible light source may collectively emit over 50 lumens, and even over 100 lumens. In some embodiments, such strips may operate at lower power that is below 50 lumens, without the eyewear, however, being used for decorative or entertainment purposes.

Figure 8:
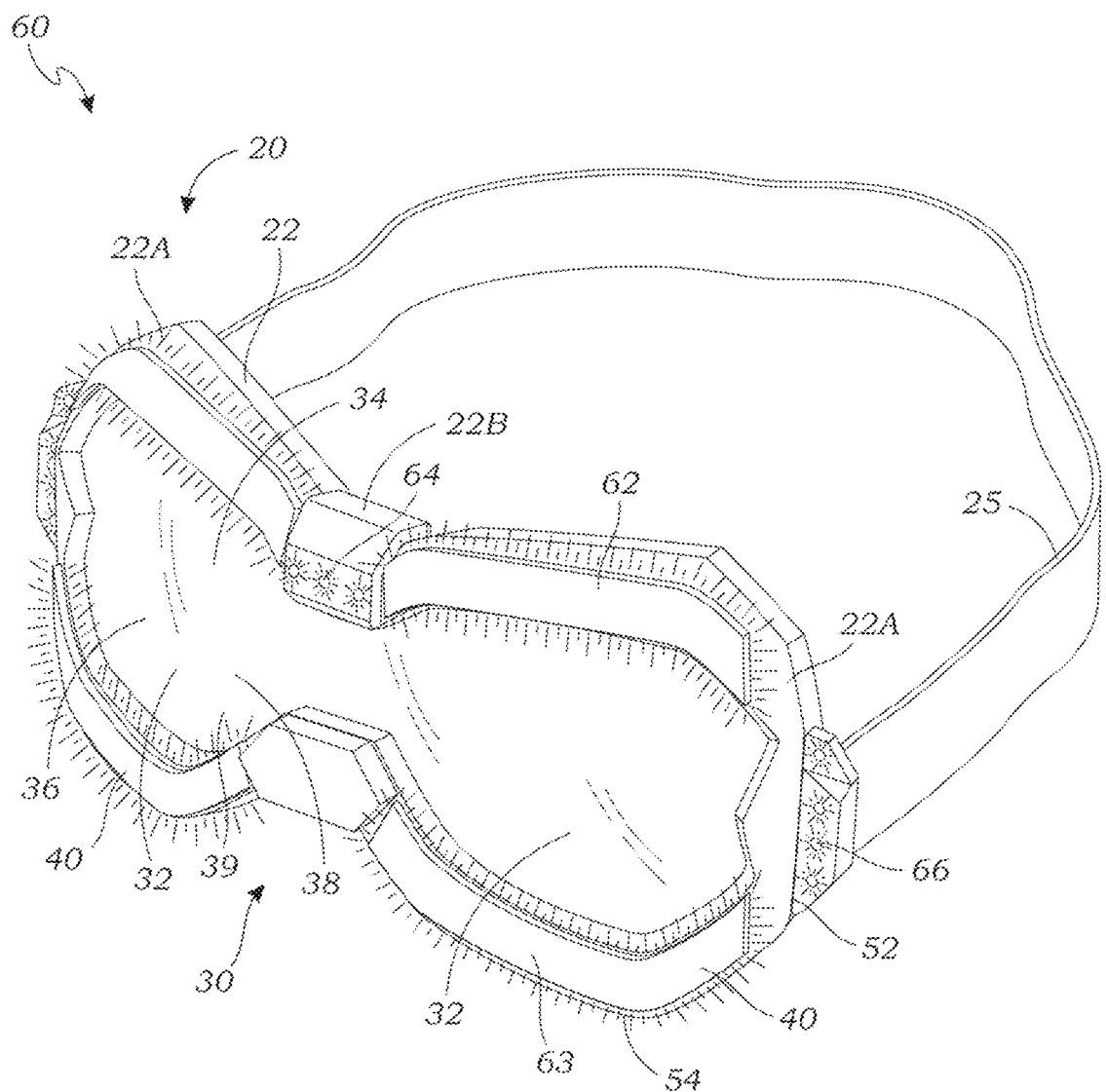
FIG. 8 is a perspective view of a fourth embodiment of the present circumambient illumination eyewear.

FIG. 8 is a perspective view of a fourth embodiment 60 of the present circumambient illumination eyewear 60. As shown in FIG. 8, the illumination strips in this embodiment are configured as two discrete upper strips 62 spaced away from one another and two discrete lower strips 63 that are also spaced apart from one another. Both upper strips 62 and both lower strips 63 disposed around the lens or lenses such that they disposed one along the upper edge 34, one along the outer side edge 36, another along the bottom edge 39, and a last one along the inner side edge 38. These strips 62, 63 may be configured to emit light from each edge 34, 36, 39, and 38 of the eyewear 60. As illustrated, in this embodiment, the upper strips 62 mounted on the bridge 22, and the lower strips 62 on the bottom frames 54. However, the upper and/or lower strips may be directly mounted to the lens(es) or some may be mounted to the frame while others may be mounted directly to the lens or lenses 32. Providing the illumination strips only on the upper and lower edges of the eyewear may also provide the desired shadowless workspace, depending upon the application and lighting requirements.

In one embodiment, also shown in FIG. 8, the light strips may further include one or more center light elements (e.g., LEDs) 64 mounted on the center portion 22B of the frame 22. In yet another embodiment, the light strips may further includes one or more side light elements (e.g., LEDs) 66 mounted on the sides of the frame 52, stereo right and left. In yet another embodiment, these side light emitting elements may be provided on short stalks extending from the sides of the frame, to provide even greater illumination than would otherwise be possible had they been located close to the user's head. According to embodiments, all of these light sources emit a collective 50 or more lumens; however, in alternative embodiments the collective luminous flux emitted thereby may be less than 50 lumens.

Figure 9:
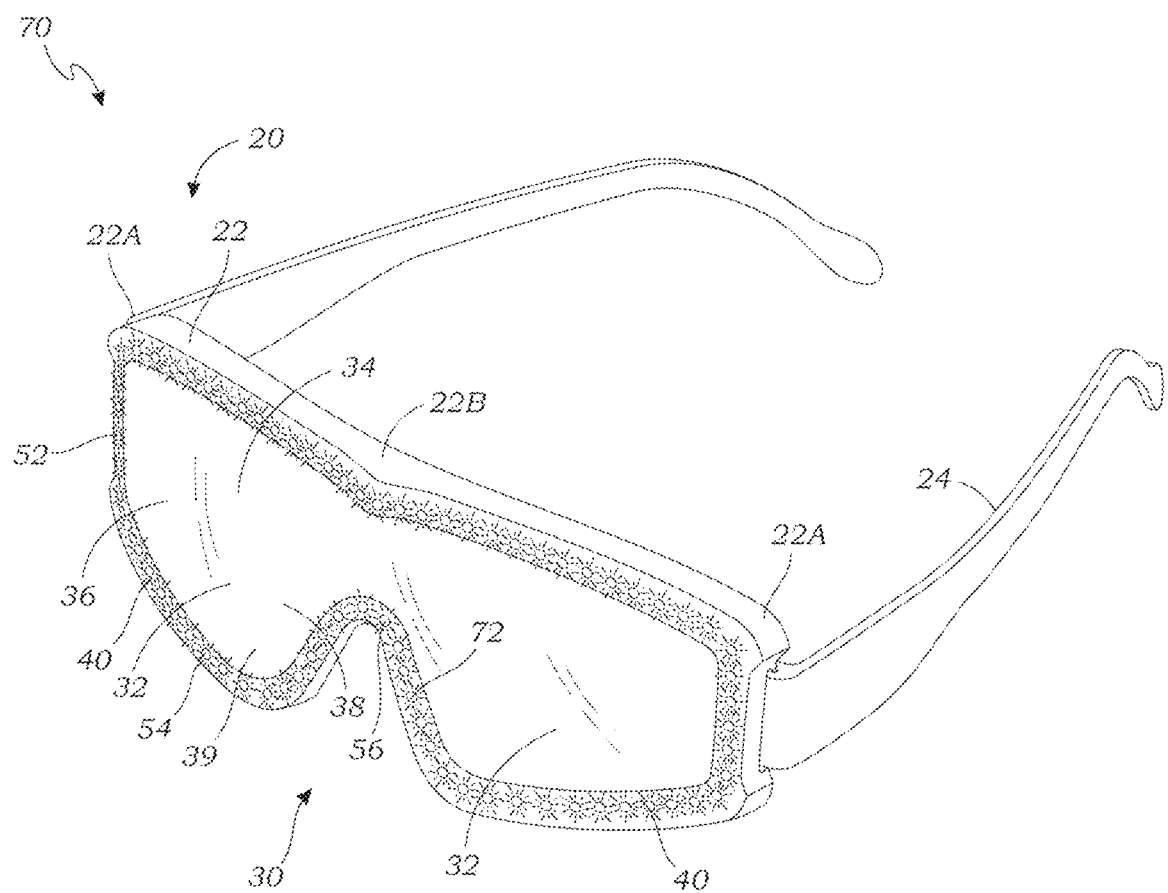
FIG. 9 is a perspective view of a fifth embodiment of the present circumambient illumination eyewear.
Figure 10:
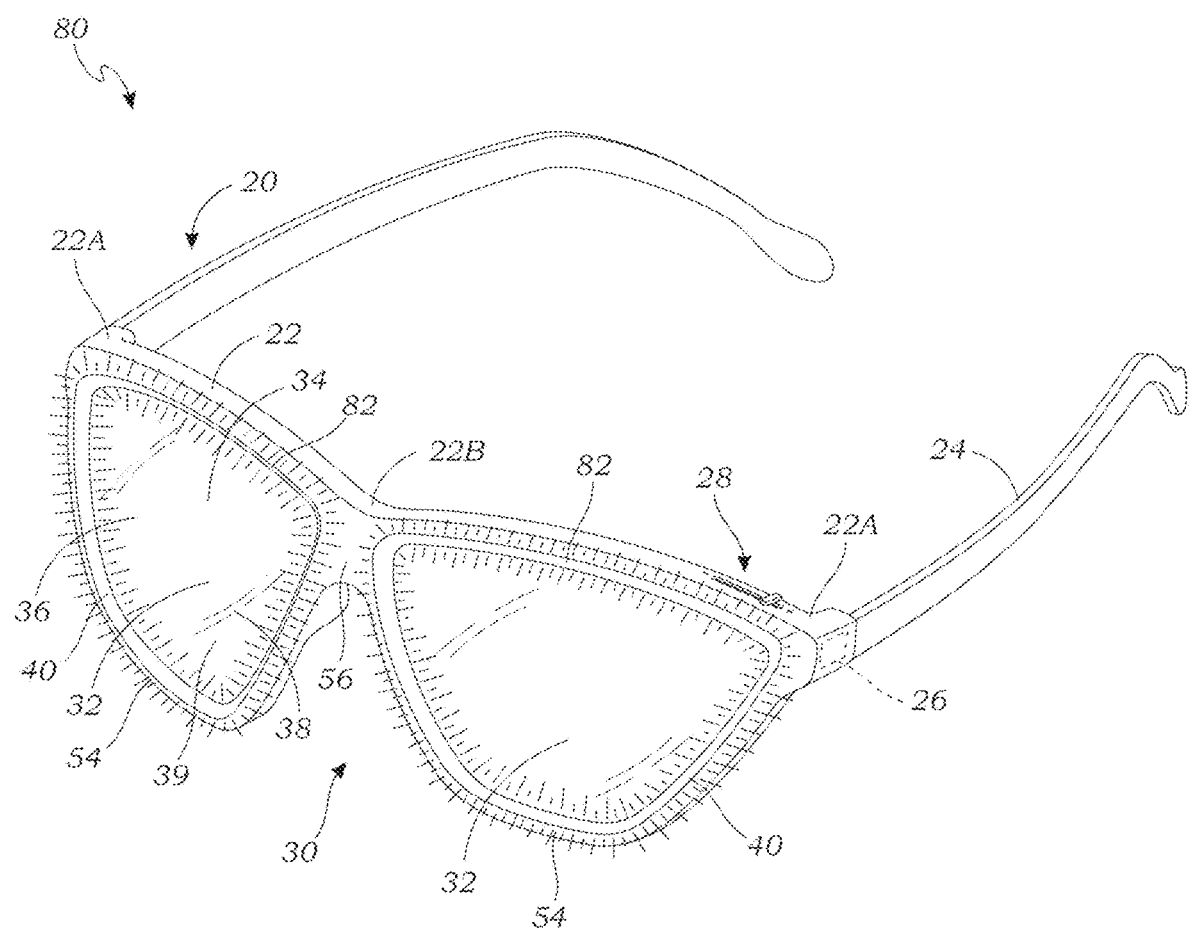
FIG. 10 is a perspective view of a sixth embodiment of the present circumambient illumination eyewear.

FIG. 9 is a perspective view of a fifth embodiment of the circumambient illumination eyewear 70, and FIG. 10 is a perspective view of a sixth embodiment of the circumambient illumination eyewear 80. Similar to the previous figures, FIG. 9 illustrates lights 72 (in one embodiment, LEDs) that extend entirely along the periphery frame 20 opposite the user's face, covering all of the bridge 22, the sides 52, the bottom 54, and the nose bridge 56. FIG. 10 illustrates an embodiment in which lighting cords 82 (any source of illumination in which the light appears to be continuous, rather than a train of discrete light sources) disposed between the outer edge of the lens 32 and the outer edge of the frame 20. In one embodiment, the lighting cord, or cords 82 integrated into the frame 20 such that it appears that (some or all of) the front-facing portion of the frame 20 is luminous. As with FIG. 9, the lighting cords 82 may extend entirely or substantially entirely (e.g., a majority) around the frame 20, in this case forming two annular structures that each entirely surround one of the eyes of the user when the glasses are worn.

Figure 11A:
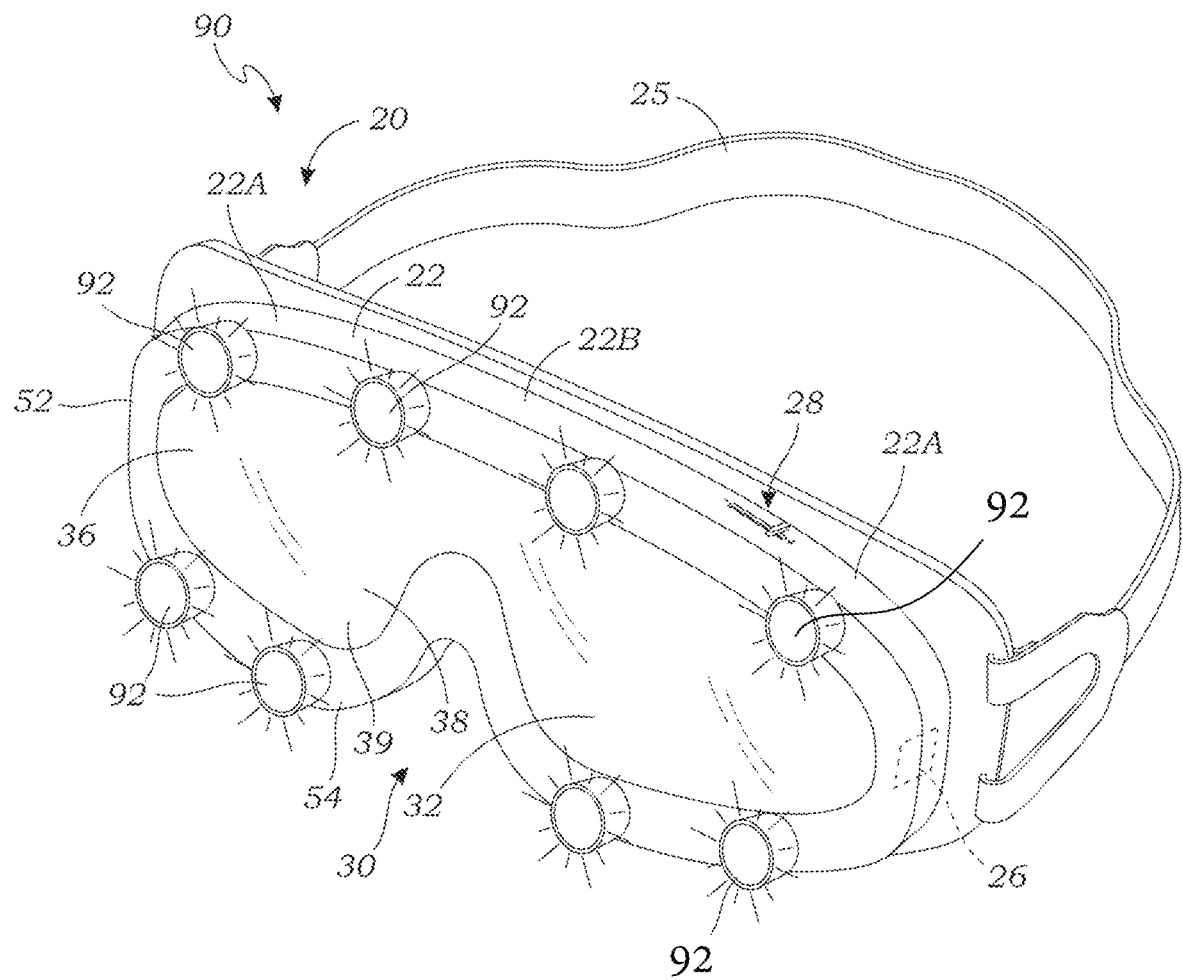
FIG. 11 is a perspective view of a seventh embodiment of the present circumambient illumination eyewear.

FIG. 11A is a perspective view of yet another embodiment of the circumambient illumination eyewear at reference numeral 90. In the embodiment of FIG. 11A, illumination is provided by a plurality of discrete lighting elements or lamps 92, disposed around the periphery of the lens or lenses and/or frame. As noted above, the plurality of lamps 92 may include one or more of LEDs, incandescent lights, or any other sources of illumination). In FIG. 11, the lamps 92 shown disposed on the bridge 22 over the upper edge 34, and on the bottom frame 54 adjacent the bottom edge 39 of the lens. In this embodiment, there are four lamps 92 along the bridge 22, and two lamps 92 on each bottom frame 54. Other configurations possible. Each of the lamps 92 may be integrated with a button battery, so that each incorporates its own power source such as a battery. In other embodiments, a single battery may be provided, electrically coupled to each of the lamps 92.

Figure 11B:
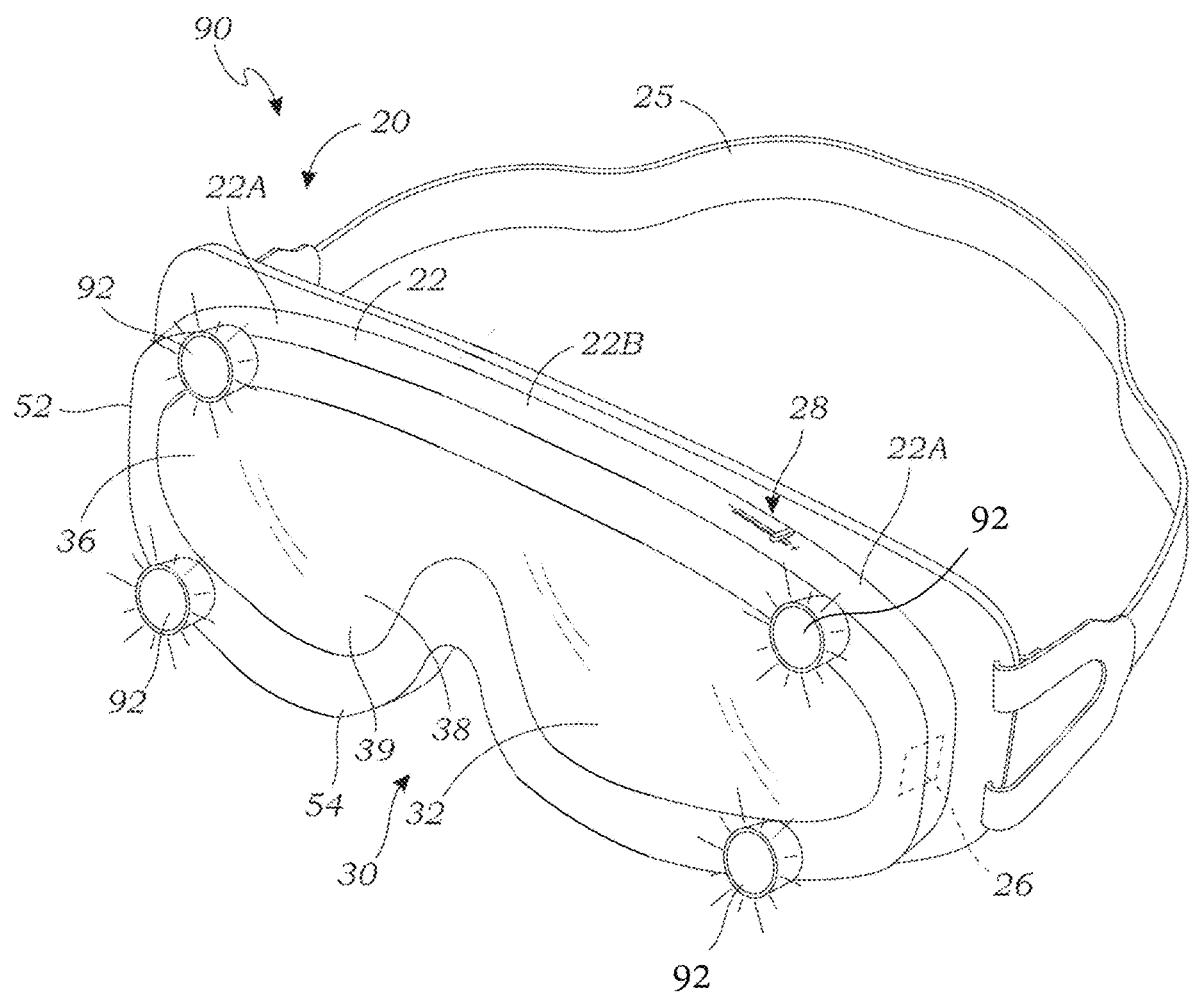

FIG. 11B is a perspective view of another embodiment of the circumambient illumination eyewear 90. In this embodiment, four discrete lamps 92 mounted to the frame, on at each corner of the circumambient eyewear. By virtue of their vertical separation and their horizontal separation on either side of the user's head, these four lamps 92 configured to project light onto the workspace in a shadow-free manner.

Figure 12:
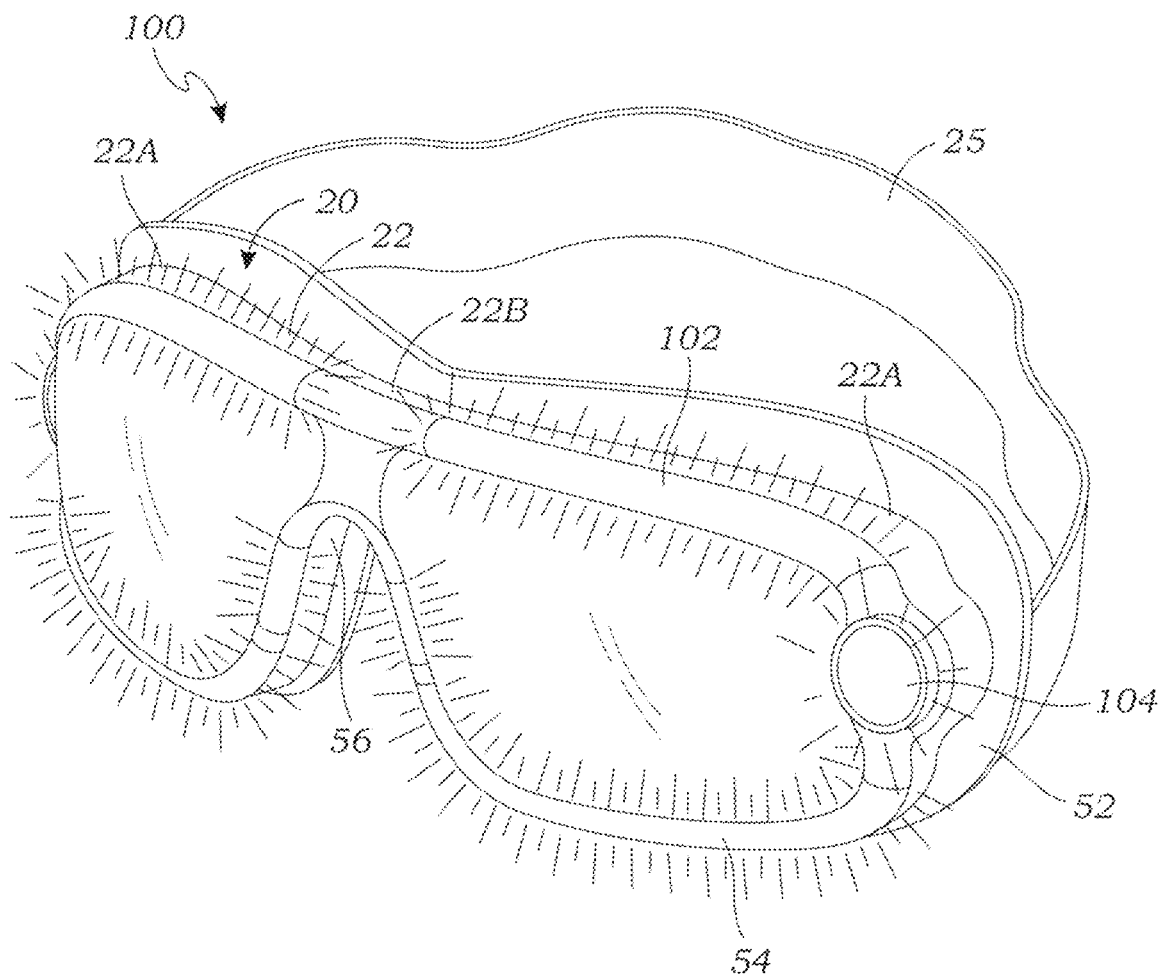
FIG. 12 is a perspective view of an eighth embodiment of the present circumambient illumination eyewear.

FIG. 12 is a perspective view of yet another embodiment of the circumambient illumination eyewear 100. As shown in FIG. 12, a combination of several types of lights, and light sizes may be implemented on a single pair of eyewear 100, in this implementation resembling a pair of goggles. As shown in FIG. 12, illumination strips 102 may be disposed on the bridge 22 above the upper edge 34 of the lens 32, and on the bottom frame 54 below the bottom edge 39 of the lens 32. In this embodiment, a discrete lamp 104 may also be mounted on each of the side frames 52, disposed adjacent the outer side edge 36.

Figure 13:
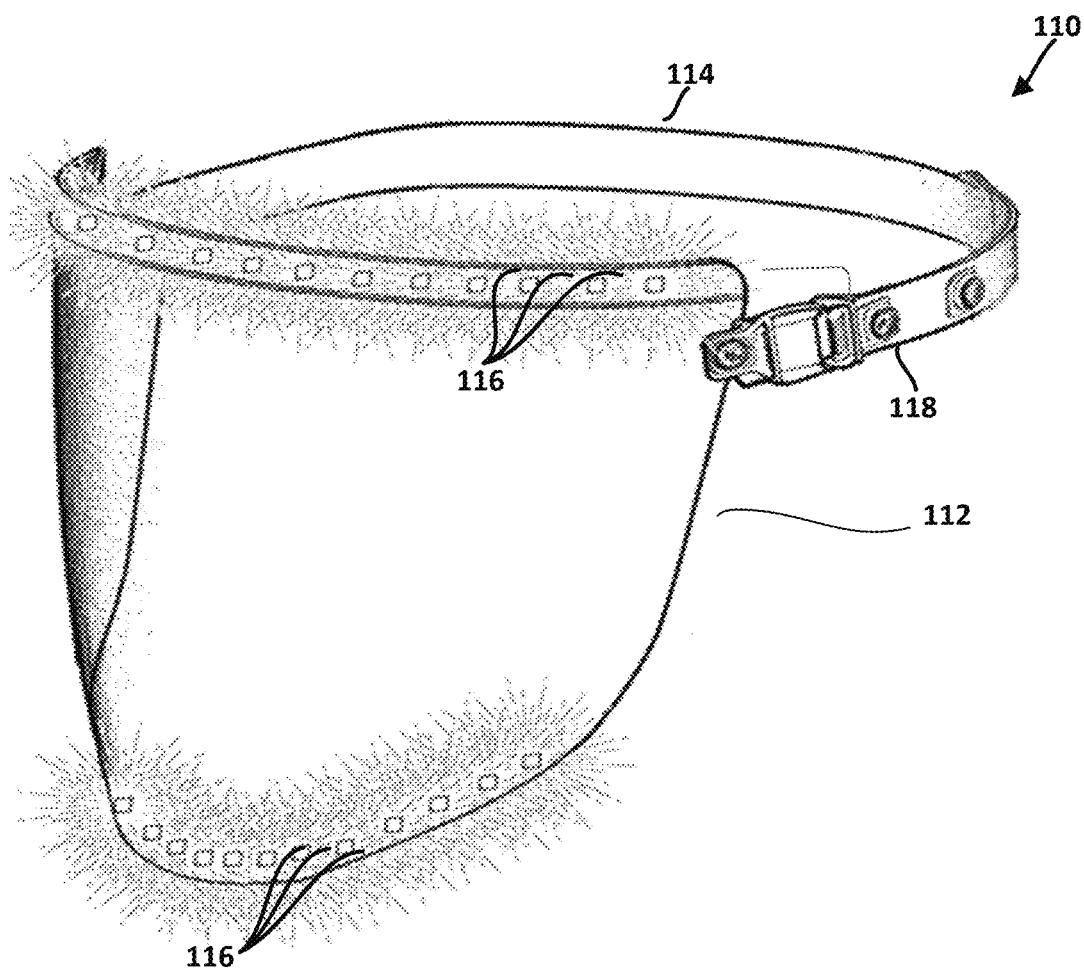
FIG. 13 shows a circumambient illumination facemask according to another embodiment.

FIG. 13 shows a circumambient illumination facemask according to another embodiment. As shown therein, the facemask 110 may include a single transparent non permeable shield 112 configured to cover a user's face; a rigid or flexible frame 114 attached to the shield and configured to enable the shield to be fitted over the user's face; a source of light 116 configured to emit a luminous flux of at least 50 lumen, the source of light 116 being mounted to at least one of the shield 112 and the frame 114 and being disposed around a periphery of the shield; and a battery 118 configured to be electrically coupled to the source of light 116*t*. The source of light 166 may be configured to face away from the user's face and to create an illuminated and shadow-free workspace facing the face mask when the face mask fitted over the user's face. The source of light 116 may include discrete light emitting elements as shown in FIG. 13 or may be or include a continuous source of light. The source of light 116 may be disposed all or most of the way around the periphery of the shield 112 or, as shown in FIG. 13, may be disposed along a top portion thereof and along a bottom portion thereof. Other implementations are possible.

For example, any of the embodiments shown or described herein may be configured to include a pop-out and replaceable lens or lenses. Such may be advantageous when the lens becomes scratched or when another type of lens is required, such as corrective lenses, filtered lenses, and the like. Moreover, embodiments may be configured to fit over and fit snuggly to the user's existing glasses, thereby avoiding the necessity of matching the lens or lenses to the user's prescription. The present eyewear may also include side light blocking shields, to prevent side glare from sources of light external to the present eyewear.

Other embodiments include a circumambient illumination device that is usable without being attached to eyewear, a circumambient illumination device that is attachable to multiple distinct kinds of eyewear and a kit comprising the removable circumambient illumination device and one or more pairs of compatible eyewear. Indeed, one embodiment is a circumambient illumination device that is self-contained and that does not require attachment to separate eyewear. A still further embodiment is a circumambient illumination device that is configured to be removably attached to existing eyewear, such as safety glasses, goggles, prescription eyewear, or face shields. Yet another embodiment is a kit comprising a) a circumambient illumination device and b) one or more eyewear, such as safety glasses, goggles, prescription eyewear, or face shields. In the kit embodiment, the circumambient illumination device may be configured to conform to and to be removably attached to the provided safety glasses, goggles, prescription eyewear, or face shield. In either embodiment, the circumambient illumination device may include one or more high-intensity light sources (e.g., LED strips, LED pods, illumination cords, or other light-emitting elements) arranged to provide circumambient illumination around above, and/or below the user's eyes to illuminate the user's field of vision or workspace in a substantially shadow-free manner. The circumambient illumination device may include Chip-on-Board (COB) LEDs. COB technology includes placing a bare LED chip directly onto a base material to create LED arrays. This method offers several benefits over older LED technologies like Surface Mounted Device (SMD) and Dual In-line Package (DIP) LEDs. For example, a greater number of LEDs may be packed into a smaller space, resulting in higher light intensity and better uniformity. Additionally, COB technology can reduce the size and energy consumption of the LED array while maintaining the same light output. For example, a COB LED array can be much smaller and more energy-efficient than an SMD or DIP LED array with the same brightness. The compactness of COB LED arrays is due to its small size, which allows for high-intensity and highly uniform light, particularly at close distances-such as the distance between the user's face and the user's workspace. The COB LED design is simple, requiring only one circuit and two contacts. Additionally, the superior thermal performance of the chip enhances its life, stability, and reliability. The present circumambient illumination devices, therefore, when equipped with illumination technologies such as COB LEDs, feature long lasting illumination, a uniform light field (further reducing shadows), minimal heat generation and long battery life.

Figure 14A:
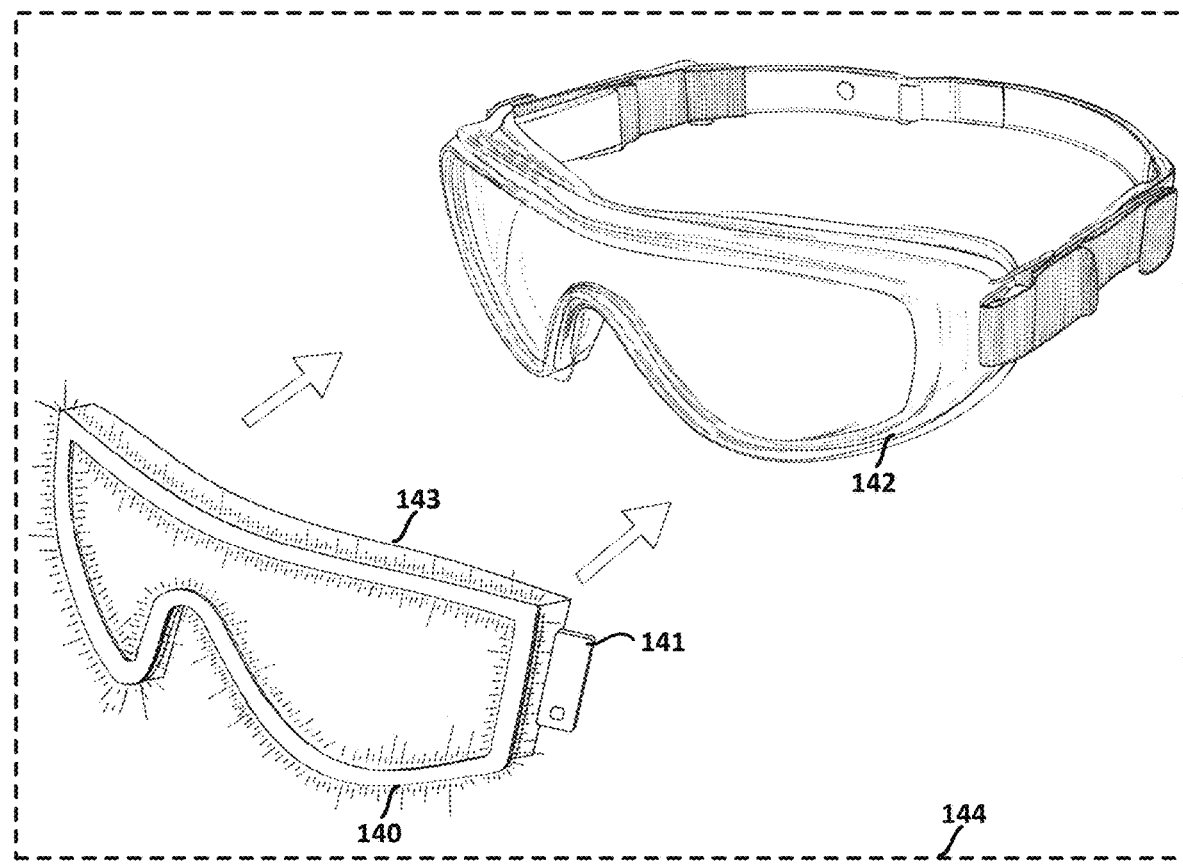
FIG. 14A is a perspective view of a circumambient illumination device configured to be removably fitted onto goggles, according to a further embodiment.
Figure 14B:
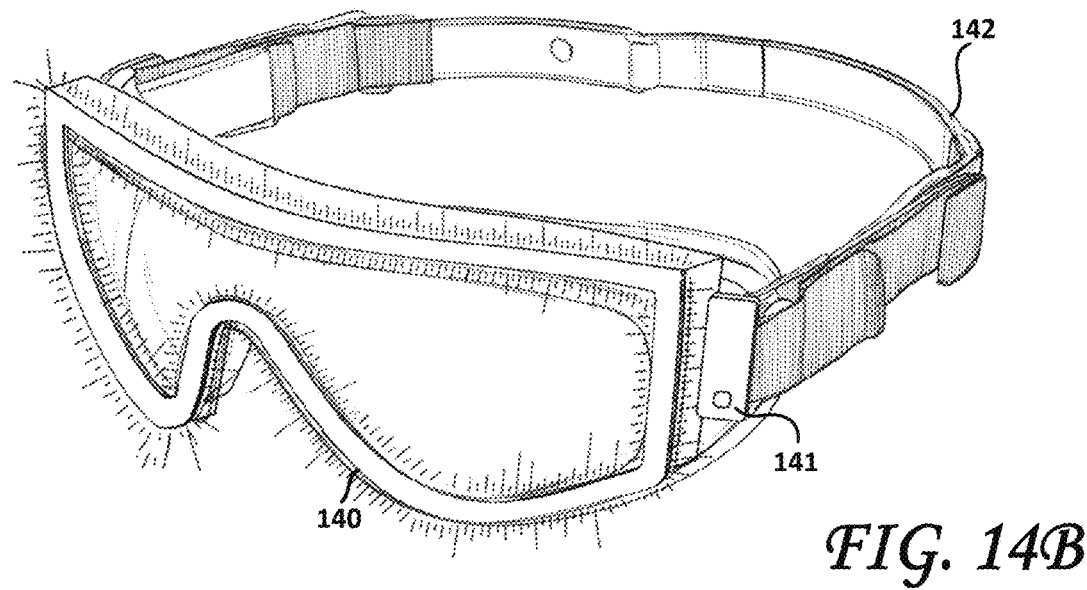
FIG. 14B is a perspective view of the circumambient illumination device of FIG. 14A removably fitted onto a pair of goggles, according to a further embodiment.

FIG. 14A is a perspective view of a circumambient illumination device 140 configured to be removably fitted onto eyewear (goggles, in FIGS. 14A and 14B), according to a further embodiment. FIG. 14B is a perspective view of the circumambient illumination device 140 of FIG. 14A removably fitted onto a pair of goggles 142, according to a further embodiment. As shown therein, the present circumambient illumination device 140 may include a light-emitting element support 143 and, as shown, at least one light-emitting element integrated with the light-emitting element support and positioned to emit light above, below and around the user's eyes. The circumambient illumination device 140 may be configured to be removably attached to the user's or other eyewear as shown in FIG. 14B using a variety of fastening mechanisms, including but not limited to snap-fit clips such as shown at 141 in FIGS. 14A, 14B, magnetic mounts, adhesive strips, hook-and-loop fasteners (Velcro), integrated rail systems, mechanical clamps, molded sleeves, compression-fit structures, or screw-on brackets, to identify but a few possibilities. In use, the circumambient illumination device 140 may be configured to provide shadow-free illumination of a workspace facing the user.

The light-emitting support 143 and other shown and described herein may include or be formed of highly impact resistant hard plastic material. In other embodiments, the light-emitting support 143 may be wholly or partially formed of a soft material, such as rubber or silicone or other functionally similar material. In one embodiment, the light-emitting support 143 may include both hard and soft sections. This enables the light-emitting support 143 to be stretched or resized to accommodate a wide variety of glasses and goggles. Flexible, adjustable arms or tension-based attachment points may be provided that expand or contract to fit various eyewear or different faces.

Figure 15A:
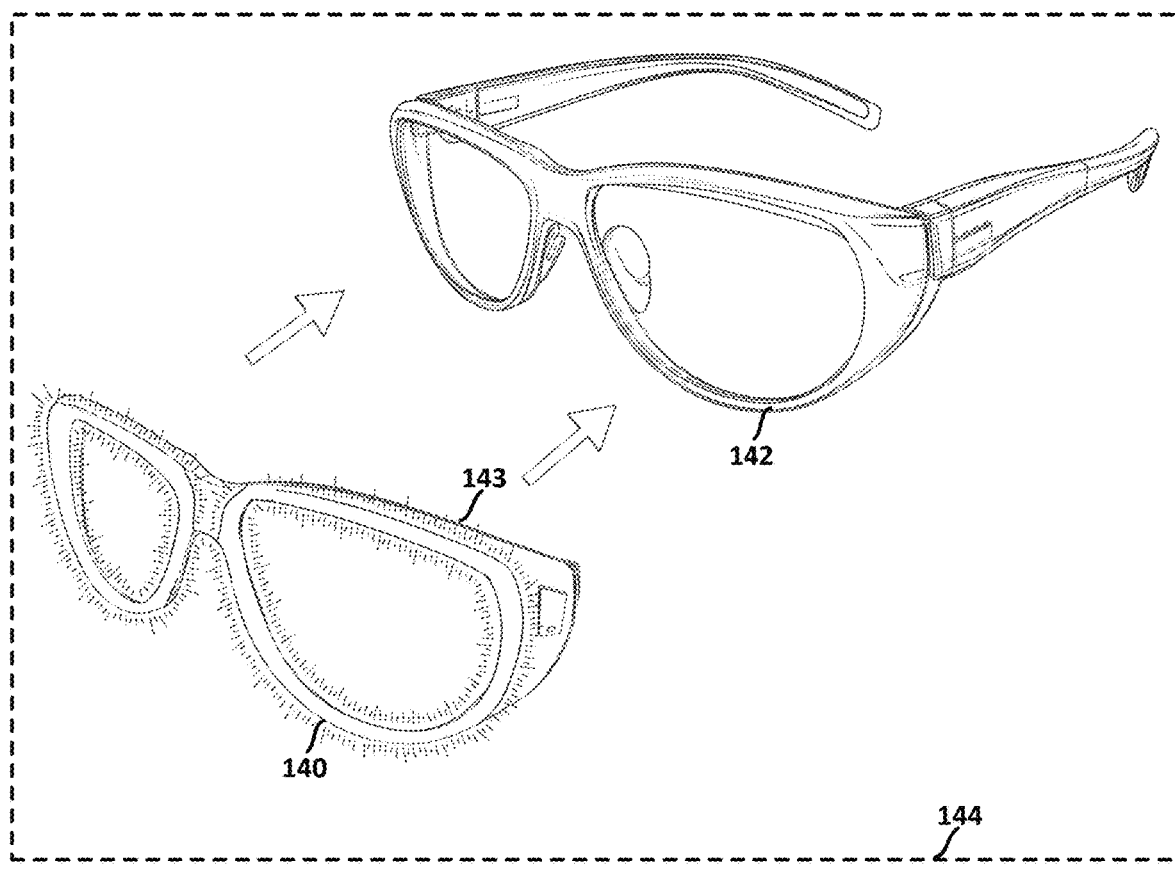
FIG. 15A is a perspective view of a Chip-On-Board (COB) circumambient illumination device configured to be removably fitted onto a pair of glasses, according to a further embodiment.
Figure 15B:
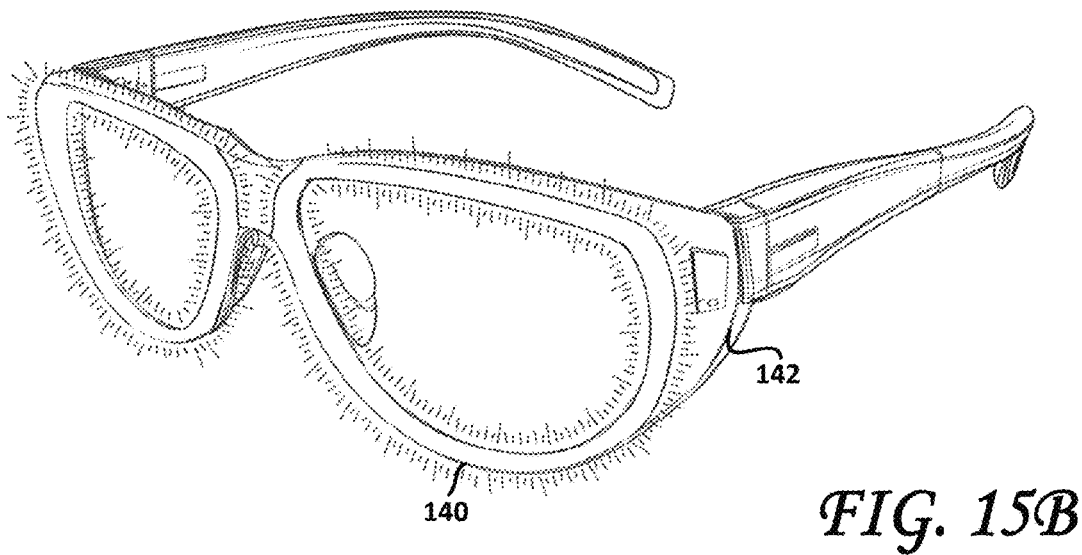
FIG. 15B is a perspective view of the COB circumambient illumination device of FIG. 15A removably fitted onto a pair of glasses, according to a further embodiment.

Together, the one or more circumambient illumination devices 140 provided, and the one or more provided eyewear units together may form and be sold as a kit 144. That is, the kit 144 may be provided with a plurality of different eyewear, each of which may be compatible with the light-emitting element support 143. This modular nature allows the kit to conform to different shapes and styles of eyewear, attachable to a support structure via any suitable fastening means. The kit, for example, may comprise one or more circumambient illumination devices 140, and a selection of compatible eyewear pieces to which the circumambient illumination devices may be attached. Such a selection of provided eyewear pieces may include, for example, a pair of safety glasses, a pair of goggles as shown in FIGS. 14A, 14B, and a pair of lightweight general purpose glasses (such as shown in FIGS. 15A, 15B) or bare frames, to enable the user to select the most appropriate eyewear for the job at hand. The modular and removable nature of the circumambient illumination devices 140 enables the user to quickly put on and take off the circumambient illumination device 140 at will, as the task at hand demands. According to embodiments, the circumambient illumination devices may be lens-less may include clear or tinted prescription or non-prescription lenses. The circumambient illumination devices 140 may be configured such that they are able to be fitted onto most eyewear using hook-like attachment points.

In other embodiments, the circumambient illumination devices 140 may be configured to be fitted onto common headwear, face shields, helmets, headbands, or any other wearable support positioned on the user's head.

A circumambient illumination device, according to an embodiment, may comprise a light-emitting element support, at least one light-emitting element integrated with the light-emitting element support and positioned to emit light above, below and around the user's eyes, and a fastening mechanism configured to attach the light-emitting element support to the user's eyewear. In this manner, in use, the circumambient illumination device is configured to provide shadow-free illumination of a workspace facing the user. For example, in FIGS. 15A and 15B, the fastening mechanism 142 may be configured as a magnet configured to be attracted to and come into intimate contact with a corresponding magnet on the eyewear or other head-worn structure.

In one embodiment, the kit 144 may be configured to include a "universal" or "one-size-fits-all" circumambient illumination device, which may be configured to be adjusted, stretched, or resized to accommodate a wide variety of glasses and goggles. According to further embodiments, such a universal circumambient illumination device may feature:

Flexible, adjustable arms or tension-based attachment points that expand or contract to fit various eyewear sizes;

Extendable or retractable light devices that adjust to different frame widths;

Swappable mounting clips or adapters to allow the same circumambient illumination device to be used on multiple types of eyewear;

Soft, form-fitting materials that conform to various frame shapes for a secure yet non-permanent fit, and/or Self-adjusting or elastic bands that provide a snug and stable fit across different frame designs.

Figure 16A:
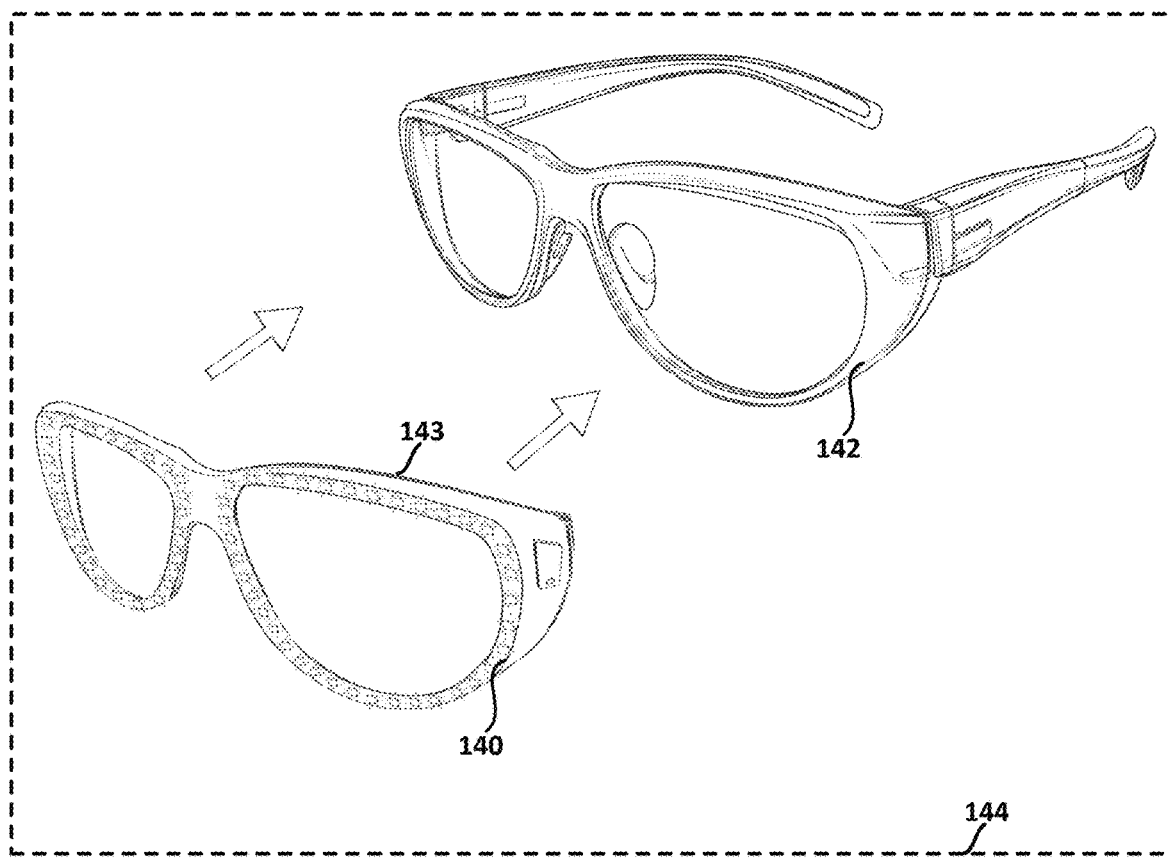
FIG. 16A is a perspective view of a circumambient Light emitting Diode (LED) illumination device configured to be removably fitted onto a pair of glasses, according to a further embodiment.
Figure 16B:
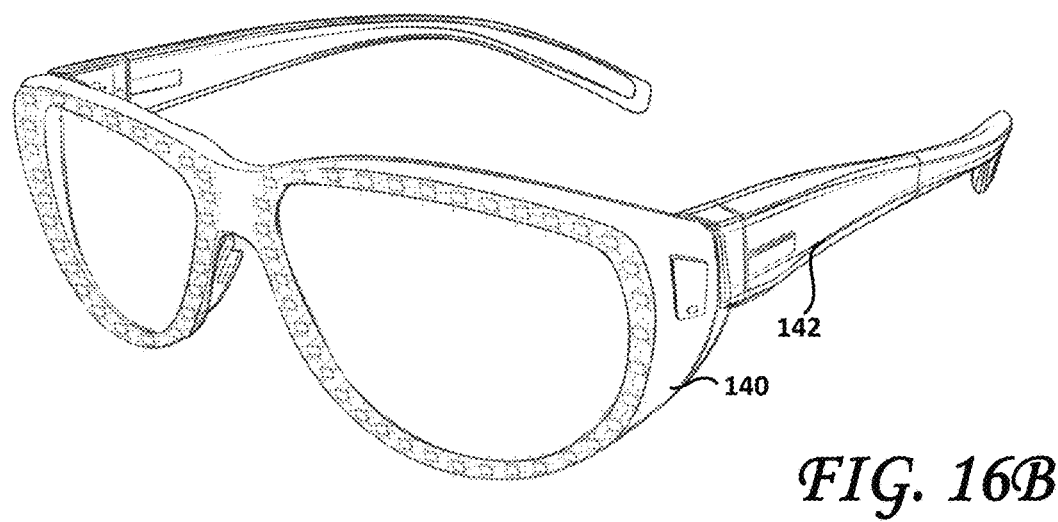
FIG. 16B is a perspective view of the LED circumambient illumination device of FIG. 16A removably fitted onto a pair of glasses, according to a further embodiment.

Whereas the circumambient illumination devices of FIGS. 14A-15B may include COB LEDs, other embodiments may include discrete LEDs, SMD LEDs or DIP LEDs, as shown in FIGS. 16A and 16B. Other technologies possible.

Significantly, the light source(s) of the circumambient illumination device may be configured and positioned to direct at least 50 lumens of illumination into the user's workspace from multiple angles-particularly from above and below the eye-line, and optionally from lateral and peripheral positions around each eye. This multi-directional lighting configuration eliminates shadows typically encountered during precision work in dimly lit environments.

Other implementations are possible. Indeed, the light-emitting element support 140 of FIGS. 15A-16B may be split in two, with one light-emitting support for each eye. Those of skill in this art may devise other minor variations and all such variations are deemed to fall within the scope of the present disclosure. For example, other non-LED light sources may include incandescent light sources such as tungsten filament, halogen, sodium vapor, neon, fluorescent, or any other light source known in the art, as deemed suitable for different lighting situations, safety considerations and desired workspace effects. Xenon-based illumination may be provided, which is particularly favored in the medical/surgical fields. Some embodiments may require an external power source electrically coupled to the circumambient illumination eyewear. In other embodiments, the illumination strip(s) may include non-visible lighting such as ultraviolet (including UVA) or infrared.

Figure 17A:
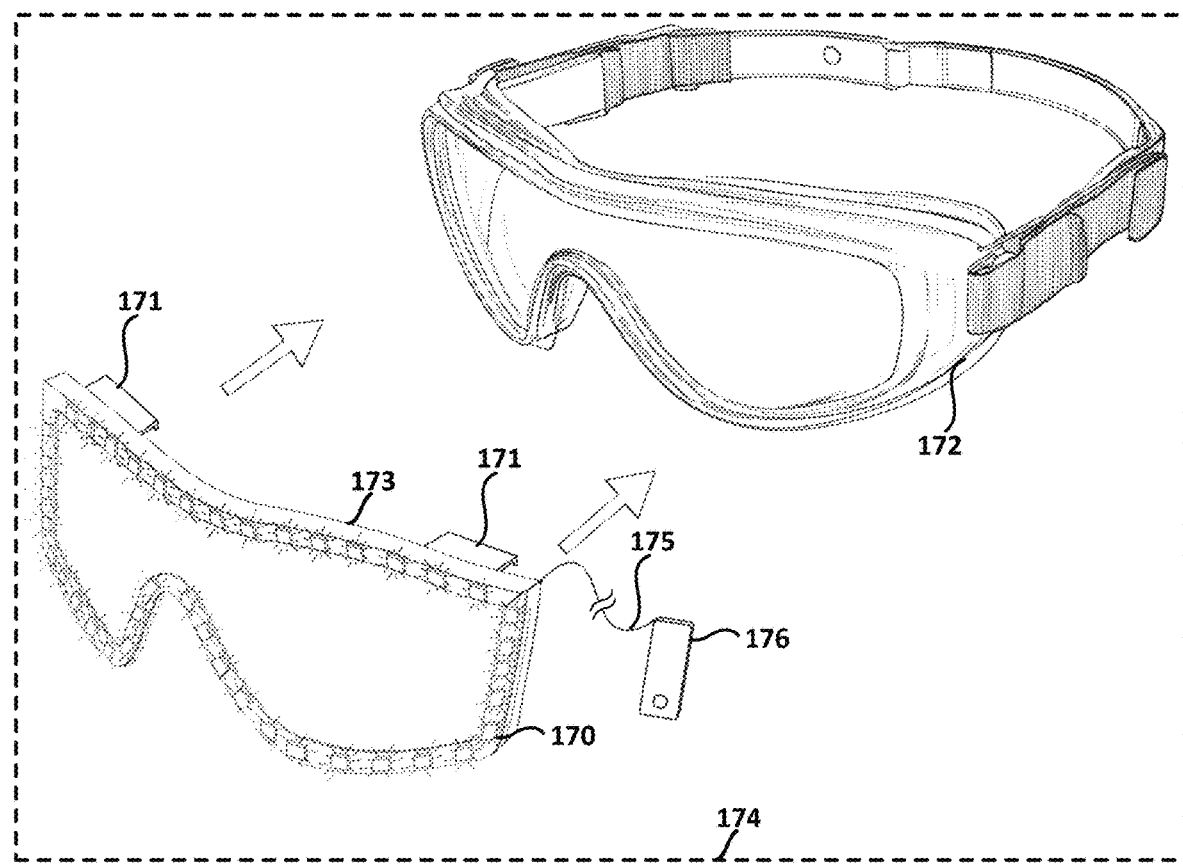
FIG. 17A is a perspective view of a circumambient illumination device configured to be removably fitted onto goggles, according to a still further embodiment.
Figure 17B:
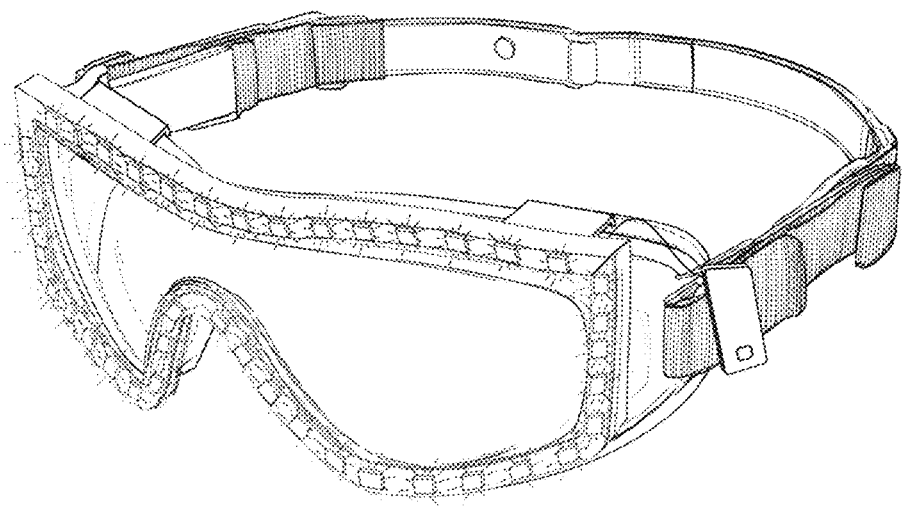
FIG. 17B is a perspective view of the circumambient illumination device of FIG. 17A removably fitted onto a pair of goggles, according to a further embodiment.

FIG. 17A shows a kit according to another embodiment. As shown therein, the kit 174 may include a circumambient illumination device 170. The circumambient illumination device 170 may include a light-emitting element support 173, at least one light-emitting element integrated with the light-emitting element support 173 and positioned to emit light above, below and around the user's eyes, and a fastening mechanism 171 configured to attach the light-emitting element support to the user's eyewear. The fastening mechanism 171, as shown, enables the circumambient illumination device 170 to be removably attached to eyewear or other head-mounted support structure (goggles 172 in the implementation shown in FIGS. 17A, 17B). In this embodiment, the attachment mechanism 171 of the circumambient illumination device to the goggles 172 takes the form of simple track portions or lipped edges that may be configured to fit over the facing portion of the goggle's frames, thereby hanging the circumambient illumination device 170 on the user's eyewear 172.

The power supply for the circumambient illumination devices may be selected according to the intended use case and may include integrated battery packs, external battery packs, USB-rechargeable devices, or inductive wireless power options. The power source may be mounted directly on the eyewear, on a separate clip-on battery unit, or permanently or removably connected via a cable 175 to an external power pack 176, as shown in FIG. 17A.

The present universal circumambient illumination devices enable users to convert standard eyewear into high-performance task lighting systems without replacing their existing equipment. The universal embodiment, in particular, provides an accessible, cost-effective, and flexible solution for users who require portable circumambient lighting across multiple pairs of eyewear. According to embodiment, the universal circumambient illumination device may be configured for use without the need for glasses, goggles, or other eyewear. Instead, the universal circumambient illumination device may incorporate temples (the arms that run from the sides of the user's face to the user's ears) or an adjustable head strap. Therefore, the universal circumambient illumination device may support light sources around, above, or below the eyes without the need for any existing eyewear (or the universal circumambient illumination device may fit over the user's own eyewear). Therefore, universal circumambient illumination device, according to embodiments, works with or without glasses, allowing users who do not wear eyewear to benefit from shadow-free lighting.

In embodiments configured to be attached to existing eyewear, fastening mechanisms may be configured to fasten the present circumambient illumination device to be removably attached to the user's existing eyewear. Such fastening mechanisms may include clips, snap-on connectors, screws/threaded fasteners, mounting brackets, mechanical clamps, spring-loaded clamps, tension bands, elastic straps, compression fir sleeves (formed of, for example, rubber, silicone, etc.), pressure fittings, interlocking tabs, dovetail joints, T-slot joints, ratchet straps, cinch cords/tightening cords, ball-and-socket joints, swivel arm mounts, peg-and-hole connections, detent-based fasteners, sliding rail mounts (e.g., sunglass clip-on style); hooking mechanisms (e.g., latching or catch-and-lock systems), hinged arms, expandable ring clamps, cable-run channels (threading light through fixed loops or guides), micro-screws/set screws, flex-fit tension arms, and built-in slotted guides or channels on frames. Those of skill in this art may devise other fastening mechanisms and all such fastening mechanisms encompassed within the scope of the present disclosure.

The fastening mechanisms for attaching the circumambient illumination device to eyewear may also comprise a magnetic attachment system that may include, for example, simple magnets, polarized magnetic alignment systems, dual-layer magnetic wraparounds, magnetic and/or mechanical hybrid fasteners (magnet aligns, clip secures), and/or magnetic pads embedded into silicone or flexible arms. Again those of skill may devise other magnetic attachment mechanisms.

According to further embodiments, the fastening mechanisms for attaching the circumambient illumination device to eyewear may also comprise adhesive and/or chemical attachment methods. For example, the following may be used: permanent adhesives, repositionable adhesives, pressure-sensitive adhesive (PSA) strips, thermal adhesives (heat-activated bonding), UV-curable adhesives, epoxy or resin-based bonding (semi-permanent), peelable low-tack glues, nanogel reusable adhesive pads, double-sided adhesive foams, hot melt adhesives, suction-based mounts and/or micro-suction pads (like those used in phone holders), to identify but a few possibilities.

According to further embodiments, the fastening mechanisms for attaching the circumambient illumination device to eyewear may also comprise textile and/or fabric-based fasteners, such as hook-and-loop fasteners, snap buttons, wraps with toggles or cord locks, sewn-in mounts, elastic fabric sleeves or pockets, stitch-in channels for light strips or wires, drawstring-style cords, and/or headbands with sewn light-mounts, for example.

According to still further embodiments, the fastening mechanisms for attaching the circumambient illumination device to eyewear may also comprise hybrid/integrated systems, to include, in various embodiments, magnet and clip combinations, strap and hook systems, light devices with pivot/swivel mounts, light track systems (sliding/locking rails), ball-and-socket mounts for directional adjustment, custom-fit 3D printed adapters or frames, molded snap-fit plastic elements, modular components with multi-position locking and/or universal mounting base with interchangeable clips.

In still further advanced/niche implementations, embodiments of the circumambient illumination device may be removably attached to a head support, and/or existing eyewear or goggles using expandable foam inserts (e.g., memory foam that hardens), hydrogel tension sleeves, surface-tension or tack-based friction fits, form-fitting silicone wraps, optical cable (fiber) integration with frame channels, xenon or specialty lighting with external power harnesses, electrically conductive fasteners (e.g., that combine magnetic clip and power), adhesive-backed LED film or light sheet with flexible substrate, and/or wireless attachment with integrated power transfer (inductive).

Figure 18A:
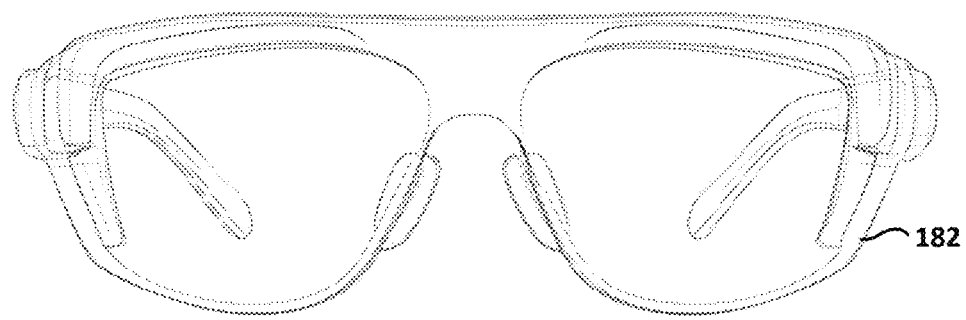
FIG. 18A is a perspective view of a multi-unit circumambient illumination device configured to be removably fitted onto a pair of glasses, according to a further embodiment.
Figure 18B:
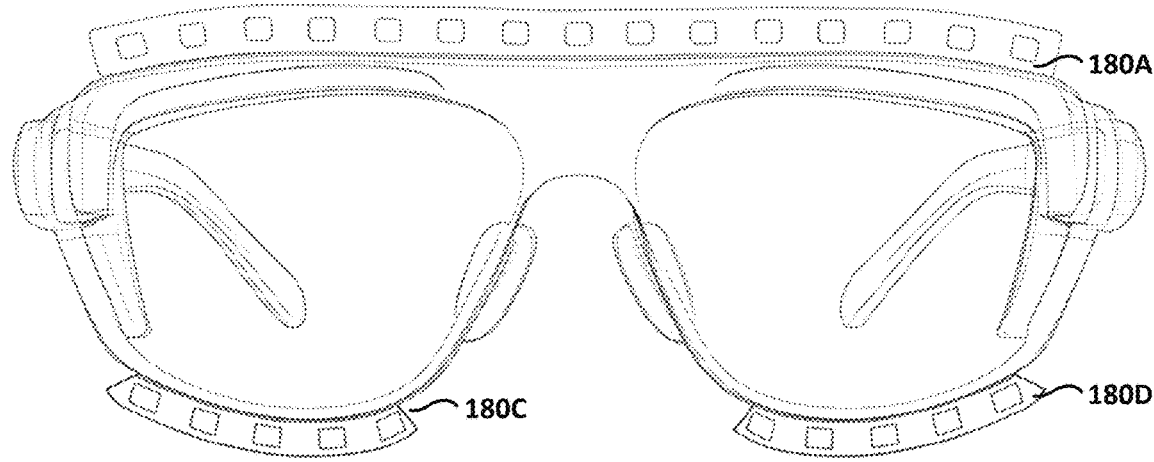
FIG. 18B is a perspective view of the multi-unit circumambient illumination device of FIG. 18A removably fitted onto a pair of glasses, according to a further embodiment.

According to further embodiments, the circumambient illumination device need not be a unitary item. Indeed, as shown in FIGS. 18A and 18B, the circumambient illumination device may include a plurality of illumination device sub-units, as shown at 180A, 180C and 180D. Each of these may be rechargeably and individually powered. The illumination device sub-units 180A, 180C and 180D may be configured to be fitted onto the top (bridge) portion of the eyewear 182 and below each of the left and right lenses thereof, respectively. The attachment mechanism may include, as shown in FIGS. 18A, 18B, matching pegs and holes or any of the other attachment mechanisms disclosed herein.

Figure 19A:
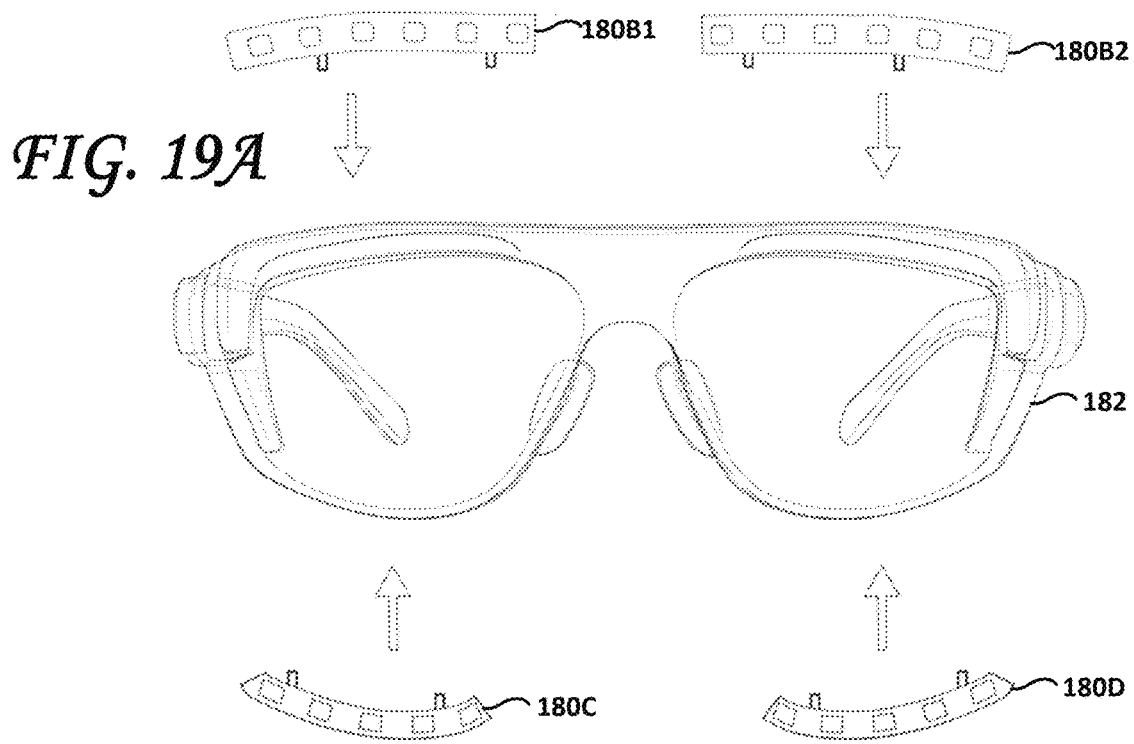
FIG. 19A is a perspective view of another multi-unit circumambient illumination device configured to be removably fitted onto a pair of glasses, according to a further embodiment.
Figure 19B:
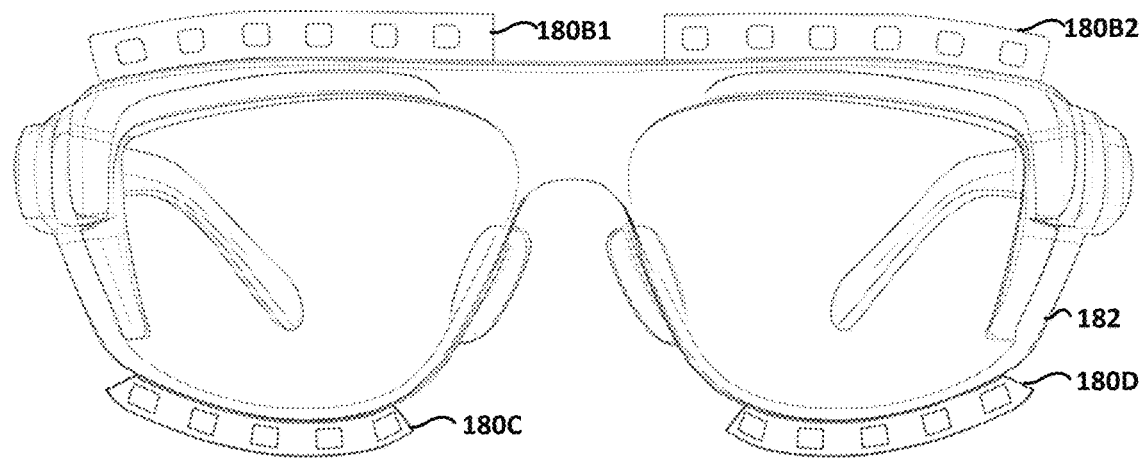
FIG. 19B is a perspective view of the multi-unit circumambient illumination device of FIG. 19A removably fitted onto a pair of glasses, according to a further embodiment.

Moreover, as shown in FIGS. 19A and 19B, the circumambient illumination device may include illumination device sub-units, as shown at 180B1, 180B2, 180C and 180D. The illumination device sub-units 180B1, 180B2 may be configured to be fitted onto the top (bridge) portion of the eyewear 182 and illumination device sub-units 180C and 180D may be configured to be fitted below each of the left and right lenses thereof, respectively. Each of these may be rechargeably and individually powered. The attachment mechanism may include, as shown in FIGS. 18A, 18B, matching pegs and holes or any of the other attachment mechanisms disclosed herein. Alternatively still, the embodiment of FIGS. 18A-19B may be implemented without lenses.

Military embodiments may be configured with red LEDs, to reduce the amount of light emitted in tactical situations. Indeed, the color (temperature) of the light emitted by the present the circumambient illumination devices may be configured according to the requirements of the tasks at hand.

Figure 20:
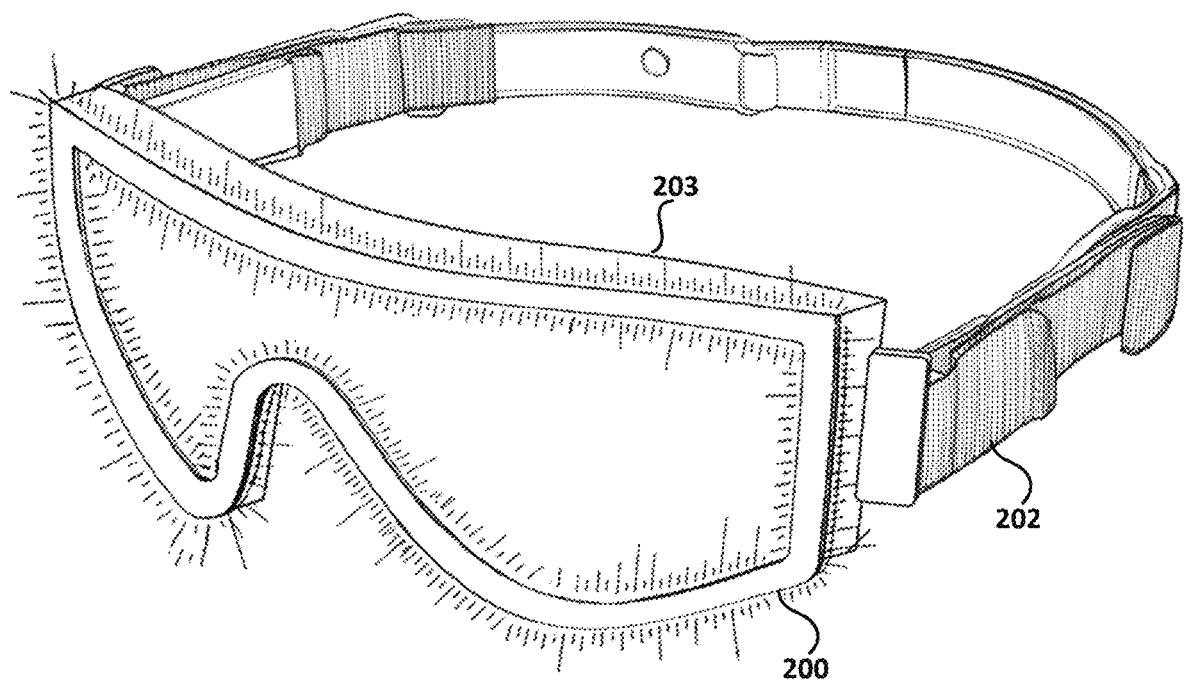
FIG. 20 is a perspective view of a standalone, frameless circumambient illumination device, according to yet another embodiment.
Figure 21:
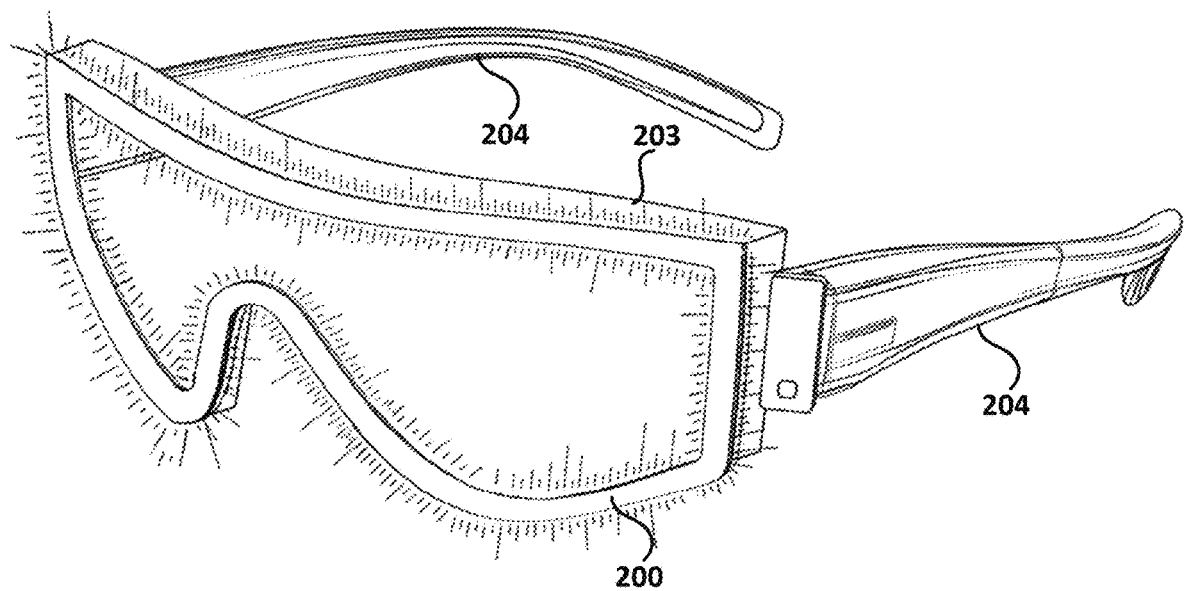
FIG. 21 is a perspective view of a lens-less COB circumambient illumination device, according to yet another embodiment.

FIG. 20 is a perspective view of a standalone, frameless COB circumambient illumination device, according to yet another embodiment. In this embodiment, the circumambient illumination device 200 may include a light-emitting element support 203 and may be integrated with an adjustable (and optionally removable) headband 202. The circumambient illumination device 200 may be lens-less or may incorporate prescription, non-prescription or safety lenses. In other embodiments, the circumambient illumination elements may be incorporated into Virtual Reality (VR) goggles, such that the user may toggle VR and circumambient illumination at will. Such may enable the user to, for example, consult schematics using VR and then toggle to circumambient illumination to check the actual circuit or mechanism for correspondence to the schematics under birth, shadowless illumination. In another embodiment, the headband 202 may be detachable from the circumambient illumination device 200, to enable the circumambient illumination device 200 to be attached to another support, eyewear, to other goggles and the like. FIG. 21 is a perspective view of a lens-less COB circumambient illumination device, according to yet another embodiment. In this view, the circumambient illumination device 200 includes a light-emitting element support 203 that is attached to a pair of temples 204. FIGS. 20 and 21 show that the present circumambient illumination device 200 may be fitted to the user's head in several different manners, to best suit the user and the task at hand.

Figure 22:
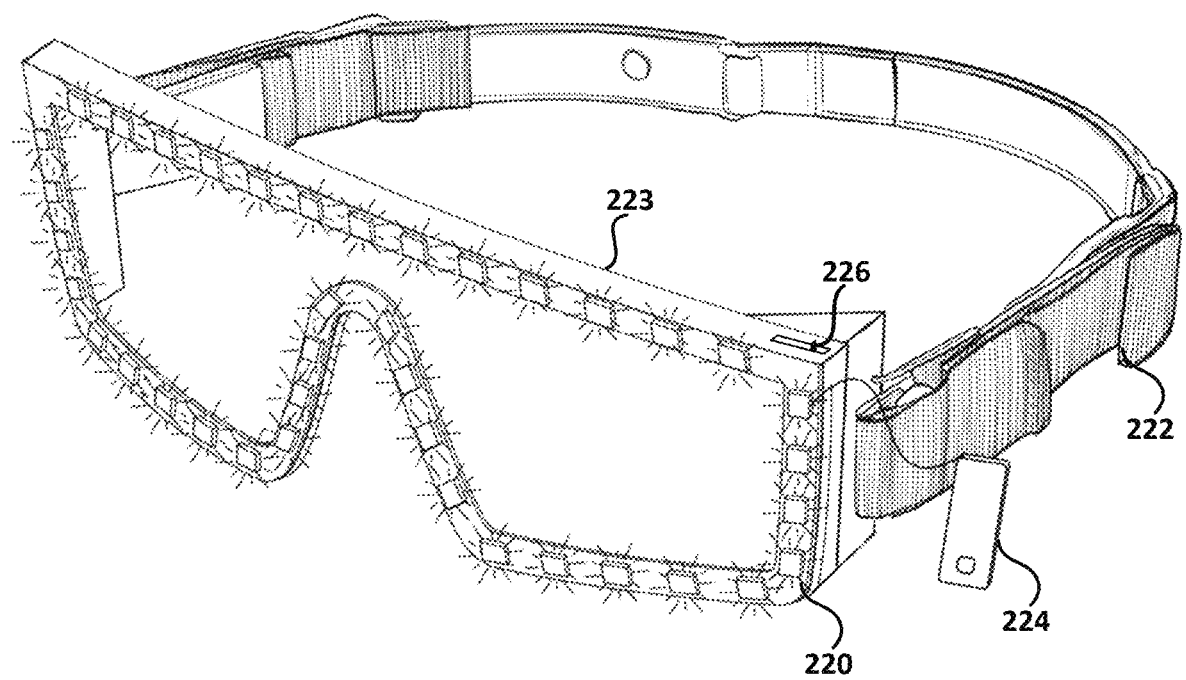
FIG. 22 is a perspective view of a lens-less LED circumambient illumination device, according to yet another embodiment.
Figure 23:
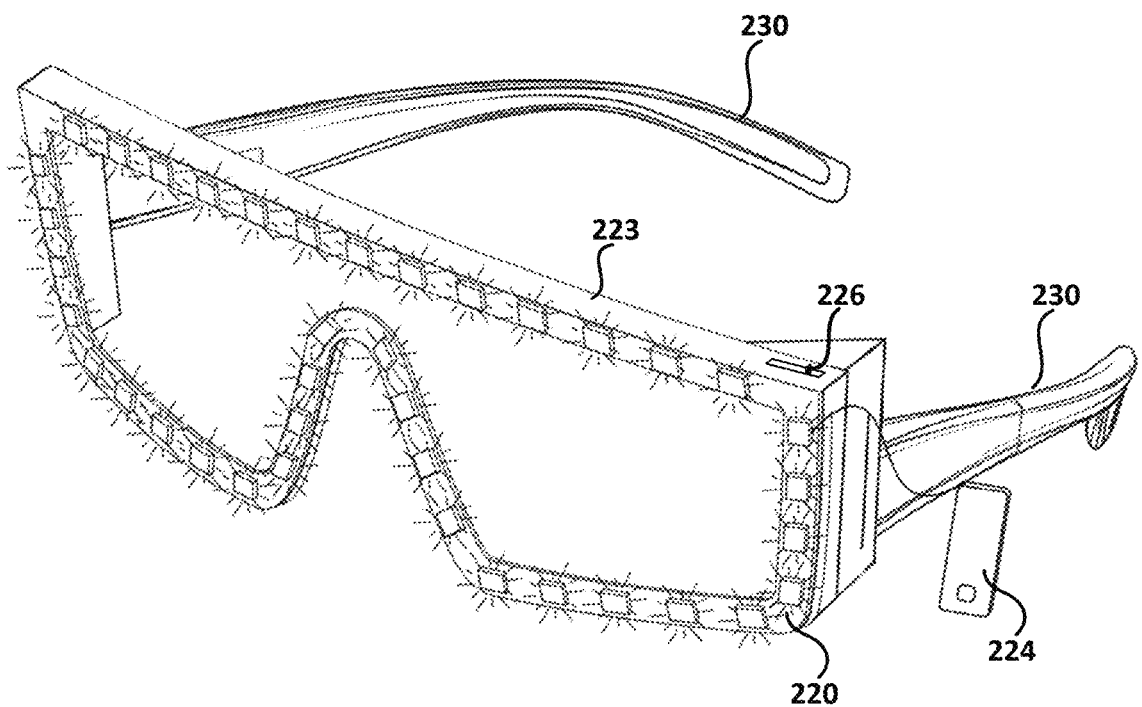
FIG. 23 is a perspective view of another lens-less LED circumambient illumination device, according to yet another embodiment

Similarly, FIG. 22 is a perspective view of a lens-less and frameless LED circumambient illumination device, according to yet another embodiment and FIG. 23 is a perspective view of another lens-less and frameless LED circumambient illumination device, according to a still further embodiment. As shown, the circumambient illumination device 220 may include a light-emitting element support 223 a plurality of discrete LEDs or an integrated strip of discrete LEDs disposed around at least a portion of the periphery of the circumambient illumination device 220. The LEDs may be integrated with the light-emitting element support 223 and positioned to emit light above, below and around the user's eyes. The light-emitting support 223 may be removably attached, as shown in FIG. 22 to a head band or other head support such that in use, the circumambient illumination device 220 is configured to provide shadow-free illumination of a workspace facing the user. A slider 226 may be provided, to enable the user to turn the illumination on and off, and to adjust the intensity of the emitted light to a comfortable level. The circumambient illumination device 220 may be wired to a power source 224 using a USB or functionally similar connection. The power source 224 may be itself rechargeable. Alternatively, the LED's source of power may be integrated into the circumambient illumination device 220 itself. The circumambient illumination device 220 may be removably attached to a headband 222 or to some other head support. FIG. 23 shows the light-emitting support element 223 of the circumambient illumination device 220 fitted to temples 230. However, the same circumambient illumination device may be attached to a pair of goggles, glasses, or any other form of support to position the circumambient illumination device 220 over the user's eyes.

One embodiment, therefore, may be a circumambient illumination device attachable to eyewear of a user. The circumambient illumination device may comprise a light-emitting element support configured to fit over a user's eyewear; a plurality of light-emitting elements integrated with the light-emitting element support and positioned to emit light above, below and around the user's eyes, and a fastening mechanism configured to attach the light-emitting element support to the user's eyewear. In use, the circumambient illumination device is configured to provide shadow-free illumination of a workspace facing the user's eyes.

In further embodiments, the light-emitting element support may include a soft material, a hard material or both hard and soft materials. The plurality of light-emitting elements may include Chip-on-Board (COB) Light Emitting Diodes (LEDs); Surface Mounted Device (SMD) LEDs; Dual In-line Package (DIP) LEDs, and/or Discrete LEDs. Other light emitting devices and technologies may also be used to similar effect. The fastening mechanism may include, for example, clips, snap-ons, magnets, adhesives, hook-and-loop fasteners, mechanical clamps, rails, and/or tension-based straps. A rechargeable battery may be integrated into or connectable to the light-emitting element support, the rechargeable battery being electrically coupled to the plurality of light-emitting elements. An on/off switch may be integrated into the light-emitting element support and electrically coupled to the plurality of light-emitting elements. A slider may be provided on the light-emitting support, the slider being electrically coupled to the plurality of light-emitting elements and configured to enable the user to control an intensity of the light emitted by the plurality of light emitting elements. The light-emitting support may be configured to enable the fastening mechanism to be swappable for another fastening mechanism to enable the user to attach the light-emitting element support to another one of the user's eyewear.

In another embodiment, the circumambient illumination device may be incorporated into a kit comprising the light-emitting element support, the plurality of light-emitting elements integrated with the light-emitting element support, at least one fastening mechanism configured to attach the light-emitting element support to the user's eyewear, and a plurality of eyewear. The light-emitting element support of the kit may be configured to removably attach to each of the plurality of eyewear using the at least one fastening mechanism.

In yet another embodiment, the circumambient illumination device may further comprise one or more lenses integrated with the light-emitting element support. The plurality of light-emitting elements may be configured to emit a luminous flux of at least 50 lumens.

Another embodiment is a circumambient illumination device, comprising a light-emitting element support configured to be worn on a user's head, a plurality of light-emitting elements integrated with the light-emitting element support and positioned, in use, to emit light above, below and around the user's eyes, and one of a pair of temples and an adjustable strap configured to support the light-emitting element support over the user's eyes. In use, the circumambient illumination device is configured to provide shadow-free illumination of a workspace facing the user's eyes.

The light-emitting element support may include a soft material, a hard material or both hard and soft materials. The plurality of light-emitting elements may Chip-on-Board (COB) Light Emitting Diodes (LEDs); Surface Mounted Device (SMD) LEDs; Dual In-line Package (DIP) LEDs, and/or Discrete LEDs. Other light-emitting technologies may also be used. The circumambient illumination device may further include a fastening mechanism configured to fasten the light-emitting element support to the at least one of the pair of temples and the adjustable strap. The fastening mechanism may include clips, snap-ons, magnets, adhesives, hook-and-loop fasteners, mechanical clamps, rails, and/or tension-based straps, for example. The circumambient illumination device may further comprise a rechargeable battery integrated into the light-emitting element support; the rechargeable battery being electrically coupled to the plurality of light-emitting elements. The circumambient illumination device may further comprise an on/off switch that is integrated into the light-emitting element support and that is electrically coupled to the plurality of light-emitting elements. A slider electrically may be coupled to the plurality of light-emitting elements and configured to enable the user to control an intensity of the light emitted by the plurality of light emitting elements. The fastening mechanism may be further configured to enable the user to attach the light-emitting element support to an eyewear of the user.

In a further embodiment, the circumambient illumination device may be incorporated into a kit comprising the light-emitting element support, the plurality of light-emitting elements integrated with the light-emitting element support, and at least one fastening mechanism configured to attach the light-emitting element support to the user's eyewear, and a plurality of eyewear. The light-emitting element support may be configured to removably attach to each of the plurality of eyewear using the fastening mechanism(s). One or more lenses may be integrated with the light-emitting element support. The plurality of light-emitting elements may be configured to emit a luminous flux of at least 50 lumens.

Significantly, embodiments provide light emitted from what amounts to an area source of illumination, which overcomes the disadvantages inherent in single point light sources that necessarily create shadows in the work area. By providing a distributed source of light(s) aimed directly at the user's workspace, detail-obscuring shadows eliminated, thereby enabling a clearer and better lit field of view than would be otherwise possible. Indeed, by providing light from multiple, spaced apart sources disposed across the width and potentially sides of the eyewear, the light impinging upon the workspace originates from sources disposed at multiple angles relative to the target, thereby reducing or eliminating the shadows that would otherwise be formed had the light originated from a single point source. Moreover, that shadowless workspace moves along with the user's head and gaze, such that whatever the user is looking at is uniformly illuminated from multiple angles, eliminating or substantially decreasing detail-hiding shadows.

While some embodiments of the eyewear illustrated herein, other embodiments will occur to those skilled in the art, including adapting the disclosed embodiments to other shapes of lenses and frames.

Embodiments may find utility wherever a brightly lit, shadow-free workspace is desired. For example, a field surgeon may benefit from a shadow-free surgical workspace, as may mechanics peering into dark and shadow-prone crevices in complex mechanical devices. Many other applications will occur to those of skill in this art.

The title of the present application, and the claims presented, do not limit what may be claimed in the future, based upon, and supported by the present application. Furthermore, any features shown in any of the drawings may be combined with any features from any other drawings to form an invention which may be claimed.

As used in this application, the words "a," "an," and "one" defined to include one or more of the referenced item unless specifically stated otherwise. The terms "approximately"

and "about" defined to mean+/−10%, unless otherwise stated. Also, the terms "have," "include," "contain," and similar terms defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the inventions have been described with reference to at least one particular embodiment, it is understood that the inventions are not limited to these embodiments, but rather the scope of the inventions is defined by the following claims.

What is claimed is:

1. A kit for a circumambient illumination device attachable to eyewear of a user, the kit comprising:
   a light-emitting element support configured to fit over a user's eyewear;
   a plurality of light-emitting elements integrated with the light-emitting element support and positioned to emit light above, below and around the user's eyes, and
   at least one fastening mechanism configured to attach the light-emitting element support to the user's eyewear,
   wherein the light-emitting element support is configured to removably attach to the eyewear of the user using the at least one fastening mechanism, and
   wherein in use, the circumambient illumination device is configured to provide shadow-free illumination of a workspace facing the user's eyes.

2. The kit for the circumambient illumination device of claim 1, wherein the light-emitting element support includes at least one of a soft material and a hard material.

3. The kit for the circumambient illumination device of claim 1, wherein the plurality of light-emitting elements includes one of:
   Chip-on-Board (COB) Light Emitting Diodes (LEDs);
   Surface Mounted Device (SMD) LEDs;
   Dual In-line Package (DIP) LEDs, and
   Discrete LEDs.

4. The kit for the circumambient illumination device of claim 1, wherein the at least one fastening mechanism includes at least one of clips, snap-ons, magnets, adhesives, hook-and-loop fasteners, mechanical clamps, rails, and tension-based straps.

5. The kit for the circumambient illumination device of claim 1, further comprising a rechargeable battery integrated into the light-emitting element support, the rechargeable battery being electrically coupled to the plurality of light-emitting elements.

6. The kit for the circumambient illumination device of claim 1, further comprising an on/off switch integrated into the light-emitting element support and electrically coupled to the plurality of light-emitting elements.

7. The kit for the circumambient illumination device of claim 1, further comprising a slider electrically coupled to the plurality of light-emitting elements and configured to enable the user to control an intensity of the light emitted by the plurality of light emitting elements integrated into the light-emitting element support.

8. The kit for the circumambient illumination device of claim 1, wherein the at least one fastening mechanism is swappable for another fastening mechanism to enable the user to attach the light-emitting element support to another one of the user's eyewear.

9. The kit for the circumambient illumination device of claim 1, further comprising at least one lens integrated with the light-emitting element support.

10. The kit for the circumambient illumination device of claim 1, wherein the plurality of light-emitting elements configured to emit a luminous flux of at least 50 lumens.

11. A circumambient illumination device, comprising:
    a light-emitting element support configured to be worn on a user's head,
    a plurality of light-emitting elements integrated with the light-emitting element support and positioned, in use, to emit light above, below and around the user's eyes,
    one of a pair of temples and an adjustable strap configured to support the light-emitting element support over the user's eyes, and
    at least one fastening mechanism configured to fasten the light-emitting element support to the at least one of the pair of temples and the adjustable strap, the at least one fastening mechanism including one of clips, snap-ons, magnets, adhesives, hook-and-loop fasteners, mechanical clamps, rails, and tension-based straps,
    wherein in use, the circumambient illumination device is configured to provide shadow-free illumination of a workspace facing the user's eyes.

12. The circumambient illumination device of claim 11, wherein the light-emitting element support includes at least one of a soft material and a hard material.

13. The circumambient illumination device of claim 11, wherein the plurality of light-emitting elements includes one of:
    Chip-on-Board (COB) Light Emitting Diodes (LEDs);
    Surface Mounted Device (SMD) LEDS;
    Dual In-line Package (DIP) LEDs, and
    Discrete LEDs.

14. The circumambient illumination device of claim 11, further comprising a rechargeable battery integrated into the light-emitting element support, the rechargeable battery being electrically coupled to the plurality of light-emitting elements.

15. The circumambient illumination device of claim 11, further comprising an on/off switch integrated into the light-emitting element support and electrically coupled to the plurality of light-emitting elements.

16. The circumambient illumination device of claim 11, further comprising a slider electrically coupled to the plurality of light-emitting elements and configured to enable the user to control an intensity of the light emitted by the plurality of light emitting elements.

17. The circumambient illumination device of claim 11, wherein the fastening mechanism is further configured to enable the user to attach the light-emitting element support to an eyewear of the user.

18. The circumambient illumination device of claim 11, incorporated into a kit comprising the light-emitting element support, the plurality of light-emitting elements integrated with the light-emitting element support, the at least one fastening mechanism configured to attach the light-emitting element support to the user's eyewear, and a plurality of eyewear, the light-emitting element support being configured to removably attach to each of the plurality of eyewear using the at least one fastening mechanism.

19. The circumambient illumination device of claim 11, further comprising at least one lens integrated with the light-emitting element support.

20. The circumambient illumination device of claim 11, wherein the plurality of light-emitting elements configured to emit a luminous flux of at least 50 lumens.

21. A circumambient illumination device attachable to eyewear of a user, the circumambient illumination device comprising:

a light-emitting element support configured to fit over a user's eyewear;

a plurality of light-emitting elements integrated with the light-emitting element support and positioned to emit light above, below and around the user's eyes, and a fastening mechanism configured to attach the light-emitting element support to the user's eyewear, the fastening mechanism being swappable to enable the circumambient illumination device to be attached to different types of eyewear, wherein in use, the circumambient illumination device is configured to provide shadow-free illumination of a workspace facing the user's eyes.

\* \* \* \* \*